(12) United States Patent
Gaddam et al.

(10) Patent No.: US 9,852,479 B2
(45) Date of Patent: *Dec. 26, 2017

(54) MECHANISM FOR REPUTATION FEEDBACK BASED ON REAL TIME INTERACTION

(71) Applicant: VISA INTERNATIONAL SERVICE ASSOCIATION, San Francisco, CA (US)

(72) Inventors: Ajit Gaddam, Sunnyvale, CA (US); Selim Aissi, Menlo Park, CA (US); Gyan Prakash, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/600,289

(22) Filed: May 19, 2017

(65) Prior Publication Data
US 2017/0262942 A1 Sep. 14, 2017

Related U.S. Application Data

(63) Continuation of application No. 14/864,784, filed on Sep. 24, 2015, now Pat. No. 9,691,109.

(60) Provisional application No. 62/078,320, filed on Nov. 11, 2014.

(51) Int. Cl.
 H04L 29/06 (2006.01)
 G06Q 50/00 (2012.01)
(52) U.S. Cl.
 CPC ......... *G06Q 50/01* (2013.01); *H04L 63/0807* (2013.01)

(58) Field of Classification Search
 CPC .................................................. H04L 63/0807
 USPC ............................................................. 726/4
 See application file for complete search history.

(56) References Cited

U.S. PATENT DOCUMENTS

| | | | |
|---|---|---|---|
| 7,065,494 B1 | 6/2006 | Evans | |
| 7,409,362 B2 | 8/2008 | Calbria | |
| 8,392,266 B2 | 3/2013 | Lombardi | |
| 8,818,882 B2 | 8/2014 | Carlson et al. | |
| 2008/0077454 A1 | 3/2008 | Shepherd et al. | |
| 2009/0210444 A1 | 8/2009 | Bailey et al. | |
| 2010/0276484 A1 | 11/2010 | Banerjee et al. | |
| 2010/0324971 A1 | 12/2010 | Morsberger | |
| 2012/0221479 A1 | 8/2012 | Schneck et al. | |
| 2013/0041823 A1 | 2/2013 | Wagner et al. | |
| 2013/0138486 A1 | 5/2013 | Gao et al. | |
| 2013/0144697 A1 | 6/2013 | Gao et al. | |
| 2013/0191304 A1 | 7/2013 | Gaucas et al. | |
| 2014/0019352 A1 | 1/2014 | Shrivastava | |
| 2014/0258169 A1 | 9/2014 | Wong et al. | |
| 2015/0006601 A1* | 1/2015 | Aissi ....................... G06F 21/60 708/250 |

* cited by examiner

*Primary Examiner* — Longbit Chai
(74) *Attorney, Agent, or Firm* — Kilpatrick Townsend & Stockton LLP

(57) ABSTRACT

A method for confirming that a user interacted with a resource provider before allowing the user to submit feedback associated with the resource provider is disclosed. A social network provider can query entities that are aware of the user's interaction history before activating a feedback function. Also, non-sensitive information can be used to identify the user.

20 Claims, 11 Drawing Sheets

MECHANISM FOR REPUTATION FEEDBACK BASED ON REAL TIME INTERACTION

CROSS REFERENCE TO RELATED APPLICATIONS

This application is a continuation of U.S. patent application Ser. No. 14/864,784, filed Sep. 24, 2015, which is a non-provisional application of and claims the benefit of the filing date of U.S. Provisional Application No. 62/078,320, filed on Nov. 11, 2014, which is herein incorporated by reference in its entirety for all purposes.

BACKGROUND

Feedback, such as online reviews, ratings, or other opinions relating to the quality of a resource provider or service provider, can be made available to prospective consumers. For example, social networks (e.g. Yelp®, Amazon®, Facebook®, etc.) sometimes provide platforms where feedback can be submitted, aggregated, and then made publicly available. Publicly viewable feedback can impact the reputation and popularity of a resource provider, and can persuade prospective consumers whether or not to interact with certain resource providers.

While publicizing feedback can help with distributing information and increasing transparency, current feedback systems are not trustworthy, as it is possible to submit fraudulent feedback. For example, in order to boost their own ratings, resource providers sometimes pose as consumers and post illegitimate positive reviews about themselves. Also, some individuals and organizations are willing to post positive reviews in exchange for payment, even when they have no experience with the subject of the review. Additionally, a user with a grudge may post multiple negative reviews about a resource provider. Further examples exist where fraudulent feedback is submitted, thereby distorting the reputation of a resource provider. Accordingly, current feedback systems may not be able to provide precise quality information about resource providers or other reviewable items and entities.

Embodiments of the invention address these and other problems individually and collectively.

SUMMARY

One embodiment of the invention is directed to a method. The method comprises receiving, at a first computer, a request from a user for permission to submit feedback associated with a resource provider, the request being received after the user has interacted with the resource provider, and after an authorization request message associated with the interaction was sent to a second computer. The method also comprises sending a transaction confirmation request message to the second computer regarding whether the user has interacted with the resource provider, and receiving from the second computer a transaction confirmation response message indicating that the user has interacted with the resource provider. The method further comprises allowing the user to submit feedback associated with the resource provider, and receiving feedback associated with the resource provider.

Another embodiment of the invention is directed to a first computer configured to perform the above-described method.

Another embodiment of the invention is directed to a method comprising receiving, at a second computer, an authorization request message associated with an interaction between a user and a resource provider and storing, by the second computer, an interaction record associated with the interaction between the user and the resource provider. The method also comprises receiving a transaction confirmation request message from a first computer regarding whether the user has interacted with the resource provider, the first computer having received a request from the user for permission to submit feedback associated with the resource provider. The method further comprises identifying the interaction record based on the transaction confirmation request message, determining that the user has interacted with the resource provider based on the interaction record, and sending a transaction confirmation response message to the first computer indicating that the user has interacted with the resource provider. The first computer then allows the user to submit feedback associated with the resource provider based on the transaction confirmation response message.

Another embodiment of the invention is directed to a first token provider computer configured to perform the above-described method.

Further details regarding embodiments of the invention can be found in the Detailed Description and the Figures.

DETAILED DESCRIPTION

Figure 1:
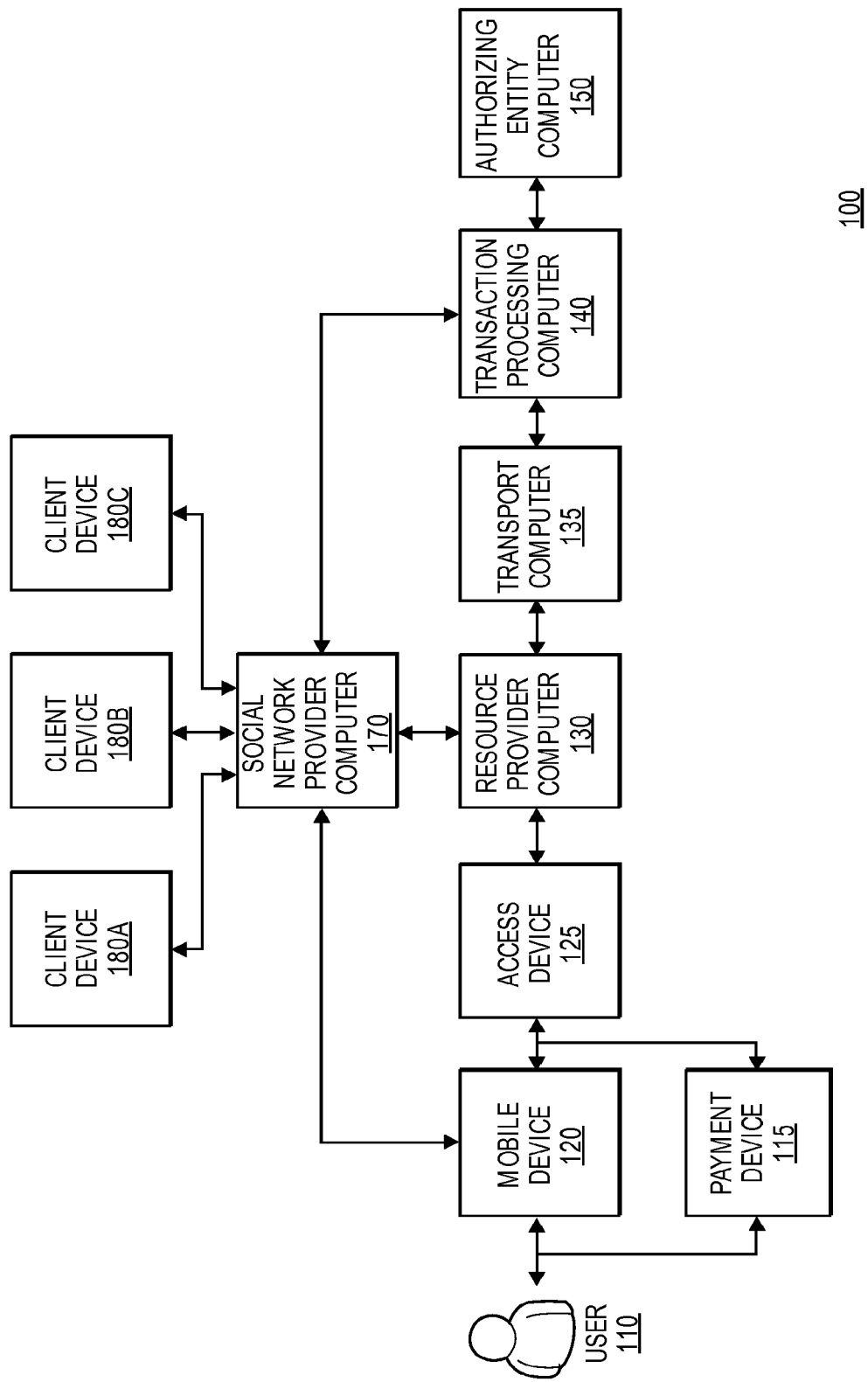
FIG. 1 shows a block diagram of a system according to an embodiment of the invention.

Embodiments of the present invention are directed to confirming that a user has interacted with a resource provider before allowing the user to submit feedback for that resource provider. For example, in some embodiments, a social network provider may query a transaction processing computer to confirm that a user interacted with a certain resource provider. The transaction processing computer may be able to identify whether such an interaction took place, and then the social network provider may allow the user to submit feedback based on transaction processing computer's response. Embodiments of the invention can also confirm that a user obtained a specific good or service before allowing the user to submit feedback for that good or service.

In some embodiments, a user's social network user account identifier can be linked with the user's payment credentials at the transaction processing computer. As a result, transactions associated with the payment credentials may also be associated with the social network user account identifier. When the social network provider queries the transaction processing computer about whether the user interacted with a certain resource provider, the social network provider may transmit the social network user account identifier to the transaction processing computer. Then, the transaction processing computer can identify whether a transaction occurred at the resource provider that involved the payment credentials associated with the social network user account identifier.

In some embodiments, a user may use a mobile device to conduct a transaction, and a mobile device identifier (e.g., MSISDN or phone number), may be provided along with payment credentials during the transaction. Then, when interacting with the social network via the mobile device, the social network provider may also obtain the mobile device identifier. When the social network provider sends the transaction query to the transaction processing computer, the social network provider may transmit the mobile device identifier. The transaction processing computer can then identify whether the user interacted with the resource provider based on the mobile device identifier.

In some embodiments, feedback tokens may be generated by the transaction processing computer or the social network provider. When a user interacts with a resource provider, a feedback token may be provided to the user. Then, when requesting permission to submit feedback, the user can provide the feedback token as proof of interacting with the resource provider.

Accordingly, only users who actually interacted with a resource provider may be able to submit feedback associated with the resource provider, and thus only legitimate reviews from actual patrons may be received. As a result, a resource provider's feedback-based reputation can be better trusted, and prospective consumers may be able to make more confident decisions.

Further, while authentic feedback is collected, users that submit feedback may be able to remain anonymous. Each method of confirming that a user interacted with a resource provider can take place without sharing sensitive information, such as a name or payment credentials. Instead, interactions can be confirmed based on a feedback token, a social network user account identifier, a mobile device identifier, or other information that is not considered sensitive or private.

Prior to discussing specific embodiments of the invention, some terms may be described in detail.

An "interaction" may include a communication, contact, or exchange between parties, devices, and/or entities. Example interactions include a transaction between two parties and a data exchange between two devices.

"Feedback" may comprise any suitable form of commentary related to an experience. Feedback may pertain to the quality of an establishment, a service, an activity, a location, or any other suitable subject. Examples of feedback include reviews, ratings, scores, comments, identification of favorite aspects, or any other suitable information. In one example, a user may leave feedback about a merchant regarding the quality of the merchant's storefront, the merchant's customer experience, the items purchased, or any other suitable aspect related to shopping at the merchant. Such feedback may serve to inform the merchant about possible areas of improvement, and/or it may be published to inform other prospective consumers about the merchant's reputation and what may be expected when shopping at the merchant.

A "feedback token" may include any suitable information that serves as evidence of permission for providing feedback. A feedback token may be a series of numbers, letters, or any other suitable characters (e.g., a string of four to six digits), as well as any object or document that can serve as confirmation. In some embodiments, a feedback token may be a one-time use token that is linked to a specific transaction. A feedback token may be valid for a certain time period, such as 24 hours.

A "social network" may include a system of relationships. A social network may be facilitated by a social network provider, which may provide a website and/or application that allows users to communicate with one another. Within a social network, users may be able to exchange information, comments, messages, images, and engage in any other suitable form of interaction. A user may be associated with a user account and/or a profile in a social network. A social network may allow aggregation and publication of feedback, and may thereby act as a feedback hub. Example social networks include Yelp®, Foursquare®, Facebook®, and Twitter®, and Amazon®.

A "mobile device" may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "device identifier" may comprise any suitable information that serves to identify a mobile device. Examples of a device identifier include a MSISDN, a phone number, an SMS text address, an IP address, or any other information that may be used to identify a mobile device. In some embodiments, a device identifier can include a unique device number, such as an international mobile station equipment identity (IMEI) number, a unique serial number (i.e., integrated circuit card identifier (ICCI)) of a subscriber identification module (SIM) card, or a unique international mobile subscriber identity (IMSI).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of mobile devices include pagers, payment cards, security cards, access cards, smart media, transponders, and the like. If the payment device is in the form of a debit, credit, or smartcard, the payment device may also optionally have features such as magnetic stripes. Such devices can operate in either a contact or contactless mode. In some embodiments, a mobile device can function as a payment device (e.g., a mobile device can store and be able to transmit payment credentials for a transaction).

A "credential" may be any suitable information that serves as reliable evidence of worth, ownership, identity, or authority. A credential may be a string of numbers, letters, or any other suitable characters, as well as any object or document that can serve as confirmation. Examples of a credential include payment credentials, coupon identifiers, information needed for obtaining a promotional offer, identification cards, certified documents, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value2), CVC3 card verification values, etc. CVV is generally understood to be a static verification value associated with a payment device. CVV values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, a payment token, and any other suitable information.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "user" may include an individual that may be associated with one or more personal accounts and/or mobile devices. The user may also be referred to as a cardholder, account holder, or consumer.

A "resource provider" may be an entity that can provide goods, services, information, and/or access. Examples of a resource provider includes merchants, access devices, secure data access points, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be referred to as a "transport computer".

An "issuer" or "authorizing entity" may typically refer to a business entity (e.g., a bank) that maintains an account for a user.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "transaction confirmation request message" may be an electronic message that requests confirmation that a transaction has taken place. For example, such a message may be used to determine whether certain user has interacted with a certain resource provider. A transaction confirmation request message may include user identifying information (e.g., a social network user account identifier, a mobile device identifier, a name, an alias, etc.), resource provider identifying information (e.g., a merchant ID, a merchant location, a merchant type, etc.), transaction-specific information (e.g., a feedback code, items purchased, an amount a timestamp, etc.), and any other suitable information for determining whether an interaction has taken place between two entities.

A "transaction confirmation response message" may be an electronic message that indicates whether a transaction has taken place. Such a message may be sent in response to a transaction confirmation request message. A transaction confirmation response message may include information about an interaction between two parties, such as user information, resource provider information, transaction-specific information, and any other suitable information.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

FIG. 1 shows a system 100 comprising a number of components. The system 100 comprises a payment device 115 and a mobile device 120 operated by a user 110. The system 100 further comprises a resource provider computer 130, a transport computer 135, a transaction processing computer 140, an authorizing entity computer 150, a social network provider computer 170, and client devices 180 (client device 180A, client device 180B, and client device 180C), each of which may be embodied by one or more computers. The mobile device 120 may be in communication with an access device 125, which may in turn be in communication with the resource provider computer 130. Also, the mobile device 120, the resource provider computer 130, the transport computer 135, the transaction processing computer 140, the authorizing entity computer 150, the social network provider computer 170, and the client devices 180 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

In some embodiments, the resource provider computer 130 may operate a merchant Website if the transaction being conducted is an e-commerce transaction. In such embodiments, the mobile device 120 may be a client device (e.g., a computer terminal), which may communicate with the merchant Website.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The system 100 can be a feedback system that allows users to submit feedback associated with resource providers, goods, services, and any other suitable item or entity. In some embodiments, the system 100 can include a payment infrastructure within which payment transactions can be processed. However, embodiments of the invention apply to any other suitable system that allows feedback of any suitable type. For example, users may be able to submit feedback associated with teachers, professors, classes, or other aspects of an education system. Users may also be able to submit feedback associated with an employer or company. Further, users may be able to submit feedback associated with a neighborhood, town, park, apartment building, or country. Embodiments of the invention allow users to submit feedback for any reviewable experience, item, or entity, whether or not a payment system or transaction is involved. Nonetheless, for descriptive purposes only, the system 100 will primarily be described herein as a system for transaction-related feedback.

The user 110 may be able to use the payment device 115 to conduct transactions with a resource provider associated with the resource provider computer 130. The payment device 115 may store information associated with the user 110 and/or a payment account. For example, the payment device 115 may store payment credentials as well as personal information such as a name, address, email address, phone number, a social network user account identifier (e.g. a username or account number), or any other suitable user 110 identification information. The payment device 115 may provide this information to the access device 125 during a transaction.

The user 110 may also be able to use the mobile device 120 for conducting transactions with the resource provider. Additionally, the user 110 may be able to use the mobile device 120 to submit feedback related to the resource provider to the social network provider computer 170. In some embodiments, the user 110 may use another device to submit feedback, such as the client device 180A.

Figure 2:
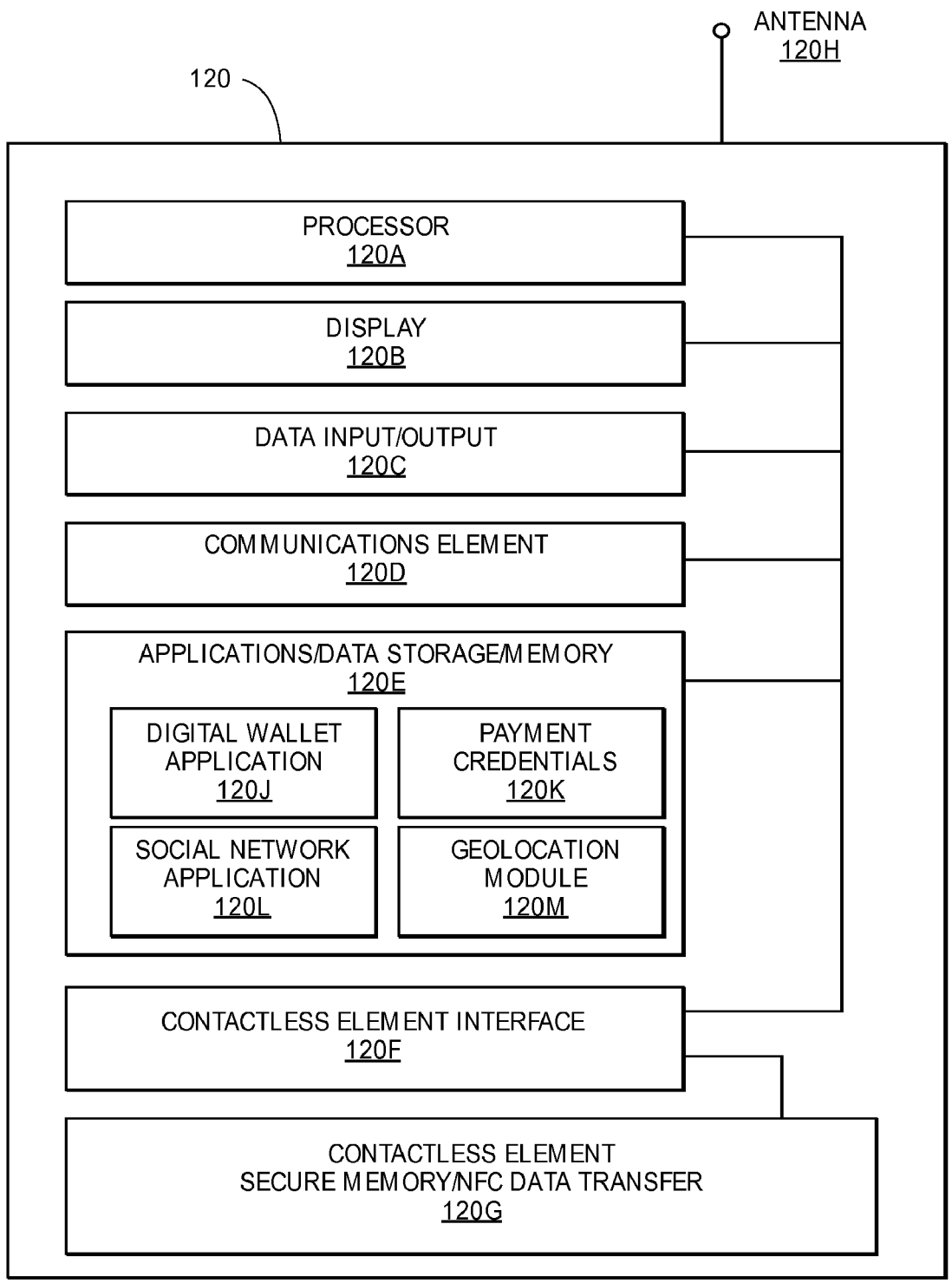
FIG. 2 shows a block diagram of an exemplary mobile device according to an embodiment of the invention.

An example of the mobile device 120, according to some embodiments of the invention, is shown in FIG. 2. Mobile device 120 may include circuitry that is used to enable certain device functions, such as telephony. The functional elements responsible for enabling those functions may include a processor 120A that can execute instructions that implement the functions and operations of the device. Processor 120A may access memory 120E (or another suitable data storage region or element) to retrieve instructions or data used in executing the instructions, such as provisioning scripts and mobile applications. Data input/output elements 120C, such as a keyboard or touchscreen, may be used to enable a user to operate the mobile device 120 and input data (e.g., user authentication data). Data input/output elements may also be configured to output data (via a speaker, for example). Display 120B may also be used to output data to a user. Communications element 120D may be used to enable data transfer between mobile device 120 and a wired or wireless network (via antenna 120H, for example) to assist in connectivity to the Internet or other network, and enabling data transfer functions. Mobile device 120 may also include contactless element interface 120F to enable data transfer between contactless element 120G and other elements of the device, where contactless element 120G may include a secure memory and a near field communications data transfer element (or another form of short range communications technology). As noted, a cellular phone or similar device is an example of a mobile device 120 that may be used in accordance with embodiments of the present invention. However, other forms or types of devices may be used without departing from the underlying concepts of the invention. For example, the mobile device 120 may alternatively be in the form of a payment card, a key fob, a tablet computer, a wearable device, etc.

The memory 120E may comprise a digital wallet application 120J, payment credentials 120K, a social network application 120L, a geolocation module 120M, and any other suitable module or data. The mobile device 120 may have any number of mobile applications installed or stored on the memory 120E and is not limited to that shown in FIG. 2. The memory 120E may also comprise code, executable by the processor 120A for implementing a method comprising sending, to a first computer, a request for permission to submit feedback associated with a resource provider, wherein the request is sent after the user has interacted with the resource provider, and wherein an authorization request message associated with the interaction was sent to a second computer; receiving, from the first computer, permission to submit feedback associated with the resource provider, wherein the first computer confirmed with the second computer that the user has interacted with the resource provider; receiving feedback associated with the resource provider from the user; and sending the feedback to the first computer.

The digital wallet application 120J may provide a user interface for the user 110 to provide input and initiate, facilitate, and manage transactions using the mobile device 120. The digital wallet application 120J may be able to store and/or access payment credentials 120K. The digital wallet application 120J may be able to cause the mobile device 120 to transmit the payment credentials 120K in any suitable manner (e.g., NFC, QR code, etc.).

The social network application 120L may provide social network services. The social network application 120L may serve as a connection to the social network provider computer 170, and may also directly include some or all of the social network functionality. The social network application 120L may include a user interface for the user 110 to submit feedback, read merchant reviews, interact with other users, and otherwise engage in social network activities. In some embodiments, the social network application 120L may allow the user 110 to "check-in" at a certain location, thereby indicating that the user 110 has visited that location. For example, the user 110 may check-in at a certain resource provider location, at an event, at or at any other suitable place or occasion. In some embodiments, the social network application 120L may not allow the user 110 to check-in unless the user 110 is physically at or near (e.g., within 100 meters) of the location.

The geolocation module 120M may comprise code that causes the processor 120A to provide geo-location services (e.g., GPS). For example, the geolocation module 120M may contain logic that causes the processor 120A to determine the position of the mobile device 120. The geolocation module 120M may determine a set of coordinates or an address associated with the position of the mobile device 120. In some embodiments, the geolocation module 120M may locate or communicate with one or more satellites in a GPS network. The geolocation module 120M may determine the position of the mobile device 120 based on the relative positions of one or more satellites (e.g. using triangulation). In some embodiments, the geolocation module 120M may determine the position of the mobile device 120 based on communications with other systems, such as a cellular tower network or another network of local positioning beacons.

In some embodiments, the social network application 120L may be able to determine if the mobile device 120 is located at or near a certain location (e.g., a resource provider location) based on information from the geolocation module 120M. For example, the social network application 120L may store or have access to information about one or more resource provider locations, such as one or more sets of coordinates or addresses associated with one or more resource provider locations. The geolocation module 120M may determine the position of the mobile device 120 and provide the position information to the social network application 120L. The social network application 120L may then be able to determine whether the position of the mobile device 120 is within a certain distance of a resource provider location (e.g. within 10, 20, 50, or 100 meters).

Referring back to FIG. 1, the resource provider computer 130 may be associated with a resource provider. The resource provider may engage in transactions, sell goods or services, or provide access to goods or services to the user 110. The resource provider may accept multiple forms of payment (e.g. the payment device 115 and the mobile device 120) and may use multiple tools to conduct different types of transactions. For example, the resource provider may operate a physical store and use the access device 125 for in-person transactions. The resource provider may also sell goods and/or services via a website, and may accept payments over the Internet.

Figure 3:
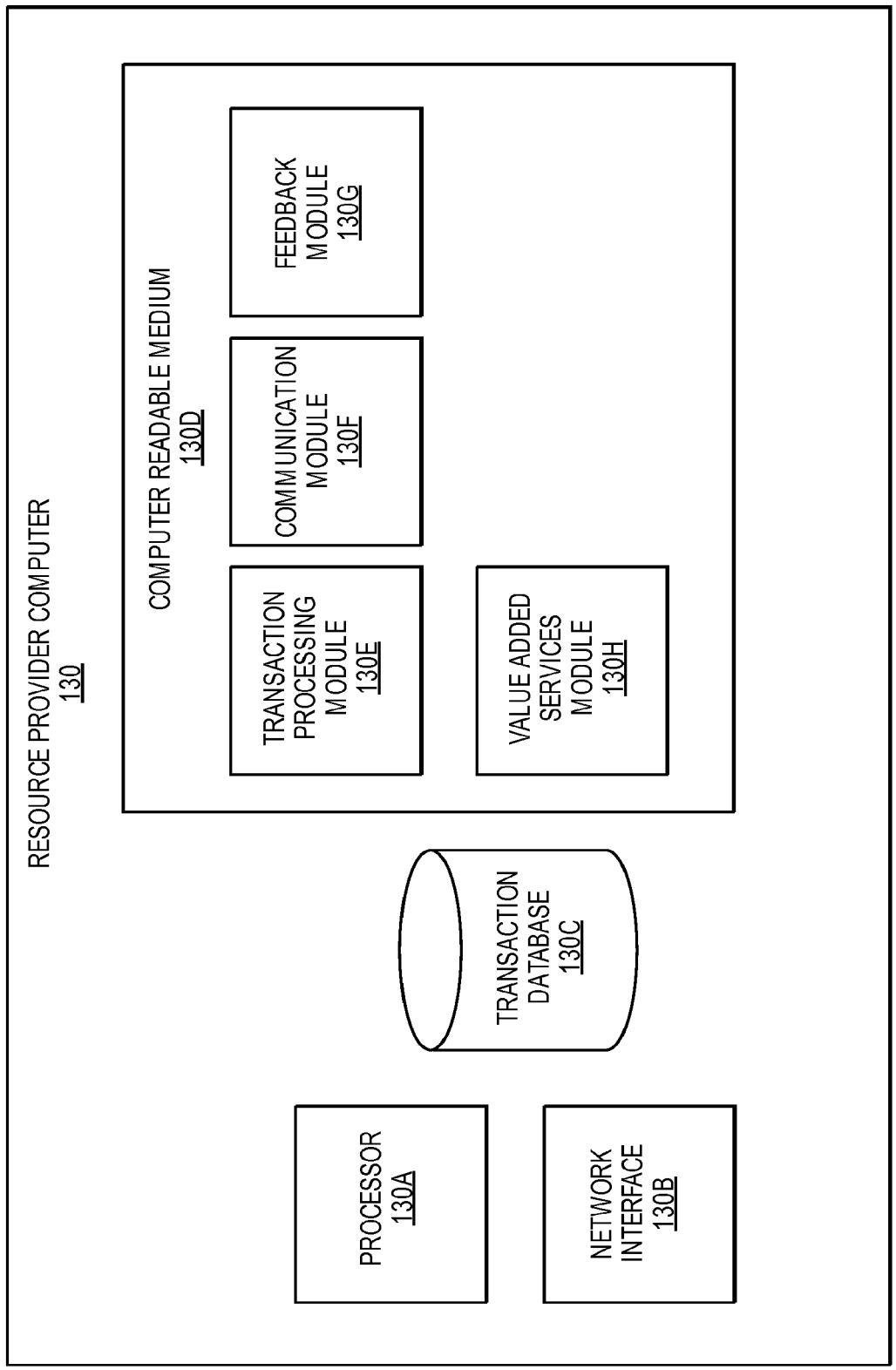
FIG. 3 shows a block diagram of a resource provider computer according to an embodiment of the invention.

An example of the resource provider computer 130, according to some embodiments of the invention, is shown in FIG. 3. The resource provider computer 130 comprises a processor 130A, a network interface 130B, a transaction database 130C, and a computer readable medium 130D.

The computer readable medium 130D may comprise a transaction processing module 130E, a communication module 130F, a feedback module 130G, a value added services (VAS) module 130H, and any other suitable software module.

The transaction processing module 130E may comprise code that causes the processor 130A to process transactions. For example, the transaction processing module 130E may contain logic that causes the processor 130A to receive payment credentials from the user 110 for a transaction. The transaction processing module 130E may be able to initiate a transaction authorization process, and may also be able to finalize a transaction so that goods and/or services can be released. The transaction processing module 130E may also be able to generate transaction receipts and store transaction records (e.g., including transaction data, user information, feedback tokens, etc.) in the transaction database 130C.

The communication module 130F may comprise code that causes the processor 130A to generate messages, reformat messages, and/or otherwise communicate with other entities. For example, the communication module 130F may contain logic that causes the processor 130A to send authorization request messages, distribute promotional offers, and monitor feedback published at the social network provider computer 170.

The feedback module 130G may comprise code that causes the processor 130A to coordinate feedback processes. For example, the feedback module 130G may contain logic that causes the processor 130A to receive feedback tokens from the social network provider computer 170 and/or the transaction processing computer 140. The feedback module 130G may be able to receive, store, and/or generate feedback tokens, as well as attribute a feedback token to a transaction and provide a feedback token to the user 110 when the user 110 makes a purchase (e.g., via a receipt). In some embodiments, the feedback module 130G may also be able to provide confirmation that a transaction took place to the social network provider computer 170.

The value added services module 130H may comprise code that causes the processor 130A to coordinate value added services. For example, the value added services module 130H may contain logic that causes the processor 130A to provide a promotional offer to the user 110. The value added services module 130H may be able to receive an indication that the user 110 is providing feedback associated with the resource provider (e.g., via a transaction confirmation response message), and then determine whether to provide a promotional offer to the user 110. The value added services module 130H may be able to send a promotional offer to the user 110 directly or via another entity (e.g., the social network provider computer 170).

Referring back to FIG. 1, the resource provider computer 130 may submit authorization requests to the transport computer 135 (which may be an acquirer computer). The transport computer 135 may be associated with the resource provider computer 130, and may manage authorization requests on behalf of the resource provider computer 130.

As shown in FIG. 1, the transaction processing computer 140 may be disposed between the transport computer 135 and the authorizing entity computer 150. The transaction processing computer 140 may include data processing subsystems, networks, and operations used to support and deliver authorization services, exception file services, and clearing and settlement services. For example, the transaction processing computer 140 may comprise a server coupled to a network interface (e.g., by an external communication interface), and databases of information. The transaction processing computer 140 may be representative of a transaction processing network. An exemplary transaction processing computer may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The transaction processing computer 140 may use any suitable wired or wireless network, including the Internet.

Figure 4:
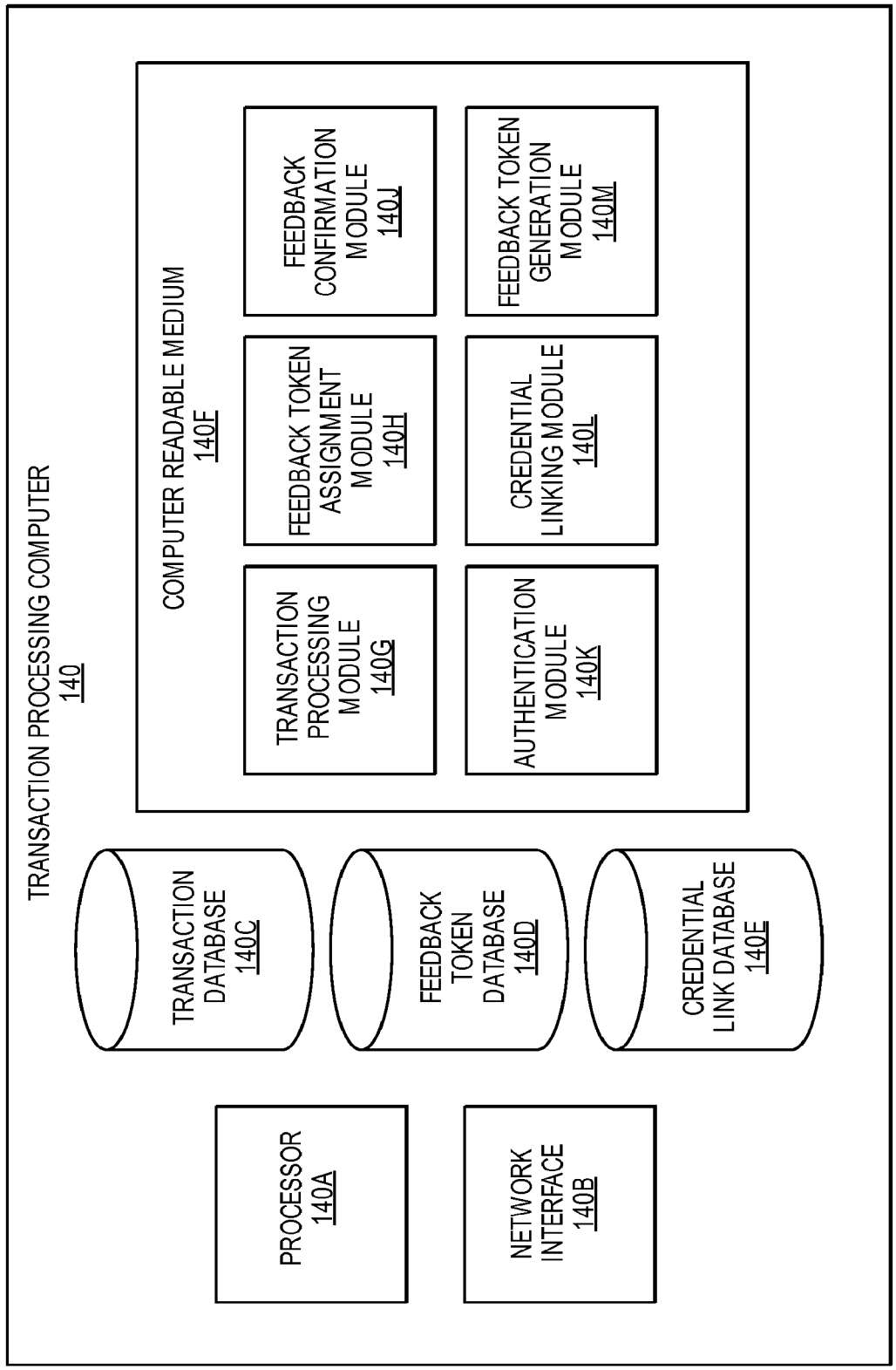
FIG. 4 shows a block diagram of a transaction processing computer according to an embodiment of the invention.

An example of the transaction processing computer 140, according to some embodiments of the invention, is shown in FIG. 4. The transaction processing computer 140 comprises a processor 140A, a network interface 140B, a transaction database 140C, a feedback token database 140D, a credential link database 140E, and a computer readable medium 140F.

The computer readable medium 140F may comprise transaction processing module 140G, a feedback token assignment module 140H, a feedback confirmation module 140J, an authentication module 140K, a credential linking module 140L, a feedback token generation module 140M, and any other suitable software module. The computer readable medium 140F may also comprise code, executable by the processor 140A for implementing a method comprising receiving an authorization request message associated with an interaction between a user and a resource provider; storing an interaction record associated with the interaction between the user and the resource provider; receiving from a first computer, a transaction confirmation request message regarding whether the user has interacted with the resource provider, wherein the first computer received a request from the user for permission to submit feedback associated with the resource provider; identifying the interaction record based on the transaction confirmation request message; determining that the user has interacted with the resource provider based on the interaction record; and sending to the first computer, a transaction confirmation response message indicating that the user has interacted with the resource provider, wherein the first computer allows the user to submit feedback associated with the resource provider based on the transaction confirmation response message.

The transaction processing module 140G may comprise code that causes the processor 140A to process transactions. For example, the transaction processing module 140G may contain logic that causes the processor 140A to analyze transaction risk, and to forward, authorize, or reject authorization request messages for payment transactions. The transaction processing module 140G may also be able to store transaction records in the transaction database 140C. For example, the transaction database 140C may include a record of each completed transaction that includes transaction details (e.g. items purchased, amount, timestamp, geolocation information), a resource provider ID, user 110 information (e.g. a name, a phone number and/or other contact information, a device identifier, an address, a driver's license number, an alias, a PAN, a date, a security code, an expiration date, or any other suitable information), and/or a feedback token.

The feedback token assignment module 140H may comprise code that causes the processor 140A to provide feedback tokens. For example, the feedback token assignment module 140H may contain logic that causes the processor 140A to assign and distribute a set of feedback tokens to a certain resource provider. The resource provider may then be able to distribute the feedback tokens to users during transactions. In some embodiments, the feedback token assignment module 140H may be able to directly assign a feedback token to a certain transaction, and may provide the feedback token to the resource provider and/or user via an authorization response message.

The feedback confirmation module 140J may comprise code that causes the processor 140A to confirm that a transaction took place and/or authorize feedback. For example, the feedback confirmation module 140J may contain logic that causes the processor 140A to receive a transaction confirmation request message, and then identify a transaction record (e.g., in the transaction database 140C) that matches the information in the transaction confirmation request message. For example, the feedback confirmation module 140J may identify a transaction based on user information (e.g., phone number, MSISDN, social network user account identifier, payment credentials, name), resource provider information (e.g., resource provider ID, location), transaction data (e.g., items purchased, timestamp), a feedback token, and/or any other suitable information. In some embodiments, the feedback confirmation module 140J may also be able to identify payment credentials associated with a social network user account identifier (e.g., in the credential link database 140E). The feedback confirmation module 140J may be able to send a transaction confirmation response message to the social network provider computer 170, the resource provider computer 130, and/or any other suitable entity.

The authentication module 140K may comprise code that causes the processor 140A to authenticate entities and information related to transaction processing and feedback processing. For example, the authentication module 140K may contain logic that causes the processor 140A to authenticate the identity of a resource provider before providing feedback tokens. The authentication module 140K may also be able to authenticate payment credentials in an authorization request message, as well as feedback tokens in a transaction confirmation request message.

The credential linking module 140L may comprise code that causes the processor 140A to create an association between different sets of credentials. For example, the credential linking module 140L may contain logic that causes the processor 140A to store a record indicating that a set of payment credentials is associated with a social network user account identifier or mobile device identifier (e.g., in the credential link database 140E). The transaction processing computer 140 or the social network provider computer 170 may provide an interface that allows the user 110 to request such a credential linking.

The feedback token generation module 140M may comprise code that causes the processor 140A to generate feedback tokens. For example, the feedback token generation module 140M may contain logic that causes the processor 140A to generate feedback tokens for a certain resource provider or for general use. The feedback token generation module 140M may also store generated feedback tokens in the feedback token database 140D. Further, the feedback token database 140D and/or the transaction database 140C may indicate whether a feedback token has been associated with a certain transaction or resource provider.

Referring back to FIG. 1, the transaction processing computer 140, the transport computer 135, and the authorizing entity computer 150 may operate suitable routing tables to route authorization request messages and/or transaction confirmation messages using payment credentials, merchant identifiers, or other account identifiers.

The authorizing entity computer 150 may issue and manage a payment account and an associated payment device 115 of the user 110. The authorizing entity computer 150 may be able authorize transactions that involve the payment account.

As mentioned above, once a transaction is complete, the user 110 may be able to submit feedback associated with the transaction, such as feedback about the user's experience with the resource provider or the quality of the purchased item. Such feedback may be submitted via a website and/or mobile application provided by the social network provider computer 170, which can then allow other users to view the feedback information.

The social network provider computer 170 may comprise a system of one or more server computers and databases. The social network provider computer 170 may be in communication with multiple users via multiple client devices. For example, FIG. 1 shows each of the client device 180A, the client device 180B, and the client device 180C in communication with the social network provider computer 170. Any other suitable number of client devices and users may be in communication with the social network provider computer 170.

Figure 5:
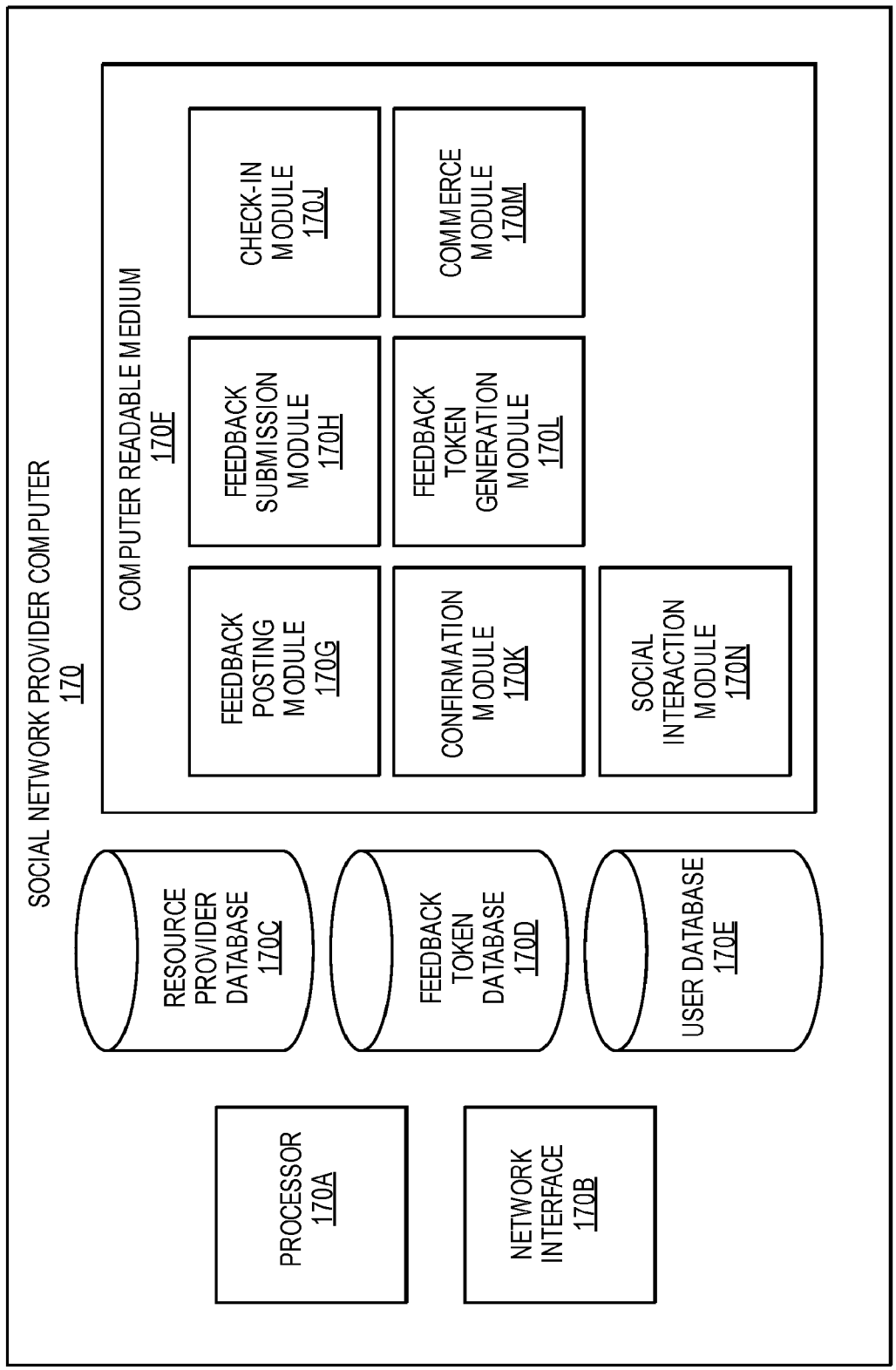
FIG. 5 shows a block diagram of a social network provider computer according to an embodiment of the invention.

An example of the social network provider computer 170, according to some embodiments of the invention, is shown in FIG. 5. The social network provider computer 170 comprises a processor 170A, a network interface 170B, a resource provider database 170C, a feedback token database 170D, a user database 170E, and a computer readable medium 170F.

The computer readable medium 170F may comprise a feedback posting module 170G, a feedback submission module 170H, a check-in module 170J, a confirmation module 170K, a feedback token generation module 170L, a commerce module 170M, a social interaction module 170N, and any other software suitable module. The computer readable medium 170F may also comprise code, executable by the processor 170A for implementing a method comprising receiving a request from a user for permission to submit feedback associated with a resource provider, wherein the request is received after the user has interacted with the resource provider, and after an authorization request message associated with the interaction was sent to a second computer; sending to the second computer, a transaction confirmation request message regarding whether the user has interacted with the resource provider; receiving from the second computer, a transaction confirmation response message indicating that the user has interacted with the resource provider; allowing the user to submit feedback associated with the resource provider; and receiving feedback associated with the resource provider.

The feedback posting module 170G may comprise code that causes the processor 170A to provide an interface for viewing social network information. For example, the feedback posting 170G may contain logic that causes the processor 170A to provide resource provider information pages, user information profile pages, recommendation services, and access to any other suitable social network information. The feedback posting module 170G may provide the results of feedback associated with a resource provider that has been collected from a number of sources. For example, the feedback posting module 170G may provide ratings, comments, recommended items, and any other suitable information associated with a resource provider. The feedback posting module 170G may provide a search functionality, such that users can search for a specific resource provider, as well as view a number of resource providers based on location, services provided, open hours, or any other suitable information. The feedback posting module 170G may also provide value added services such as promotional offers (e.g. coupons or discounts), recommendations of resource providers, and selective or hierarchal display of reviews.

The feedback submission module 170H may comprise code that causes the processor 170A to receive feedback. For example, the feedback submission module 170H may contain logic that causes the processor 170A to receive and collect reviews, ratings, commentary, etc. associated with specific resource providers and/or items from one or more users. The feedback submission module 170H may be able to update records associated with specific resource providers at the resource provider database 170C.

The check-in module 170J may comprise code that causes the processor 170A to receive check-in notifications from users. For example, the check-in module 170J may contain logic that causes the processor 170A to receive a request from a user to check-in at a certain resource provider (e.g., via mobile device). The check-in module 170J may then update a user record (e.g., at the user database 170E) and/or a resource provider record (e.g., at the resource provider database 170C) to indicate that the user checked-in at the resource provider. When a user checks-in, the user may then be given permission to provide feedback, provided a promotional offer, or otherwise given credit for checking-in.

The confirmation module 170K may comprise code that causes the processor 170A to confirm that a user conducted a transaction at a certain resource provider. For example, the confirmation module 170K may contain logic that causes the processor 170A to generate a transaction confirmation request message with user information (e.g., social network user account identifier, MSISDN, phone number, name, etc.), resource provider information, a feedback token, and/or any other suitable information. The confirmation module 170K may send the transaction confirmation request message to the transaction processing computer, the resource provider computer, or any other suitable entity. When a transaction is successfully confirmed (e.g., a positive response is received), the confirmation module 170K may then grant permission for a user to provide feedback and activate feedback functionality. In some embodiments, the confirmation module 170K may only allow the user to submit feedback if the user recently made a purchase, if the user has recently purchased the subject of the review (e.g. a certain good or service), and/or if the user recently checked-in at the resource provider.

In some embodiments, feedback tokens can be generated by the social network provider computer 170, while in other embodiments they may be generated by the transaction processing computer 140. The feedback token generation module 170L may comprise code that causes the processor 170A to generate feedback tokens. For example, the feedback token generation module 170L may contain logic that causes the processor 170A to generate feedback tokens for a certain resource provider or for general use. The feedback token generation module 170L may also store generated feedback tokens in the feedback token database 170D. Further, the feedback token database 170D may indicate whether a feedback token has been associated with a certain transaction or resource provider. The feedback token generation module 170L may also be able to assign and distribute a set of feedback tokens to a certain resource providers, which can then distribute the feedback tokens to users during transactions.

The commerce module 170M may comprise code that causes the processor 170A to provide commerce services. For example, the commerce module 170M may contain logic that causes the processor 170A to coordinate the posting and sale of goods and/or services. Resource providers may be able to sell goods and/or services via the commerce module 170M, and feedback associated with the goods and/or services may be displayed when a user is considering making a purchase.

The social interaction module 170N may comprise code that causes the processor 170A to provide user interaction functionality. For example, the social interaction module 170N may contain logic that causes the processor 170A to allow users to send messages to one another, post information to a profile page, comment on a recent purchase, or otherwise interact with one another via the social network. The social interaction module 170N may allow a user to login to a user account (e.g., by providing a social network user account identifier and/or a password). A user account (e.g., stored at the user database 170E) may contain information about a user's profile, preferences, submitted feedback, completed purchases, and any other suitable information.

Embodiments of the invention can be further described with respect to FIG. 6, FIG. 7, FIG. 8, FIG. 9, and FIG. 10. These figures includes flow diagrams for processing a transaction, for several methods of confirming that a transaction has taken place, and for providing promotional offers.

The various messages described below in FIG. 6, FIG. 7, FIG. 8, FIG. 9, and FIG. 10 may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

I. Processing a Transaction

Figure 6:
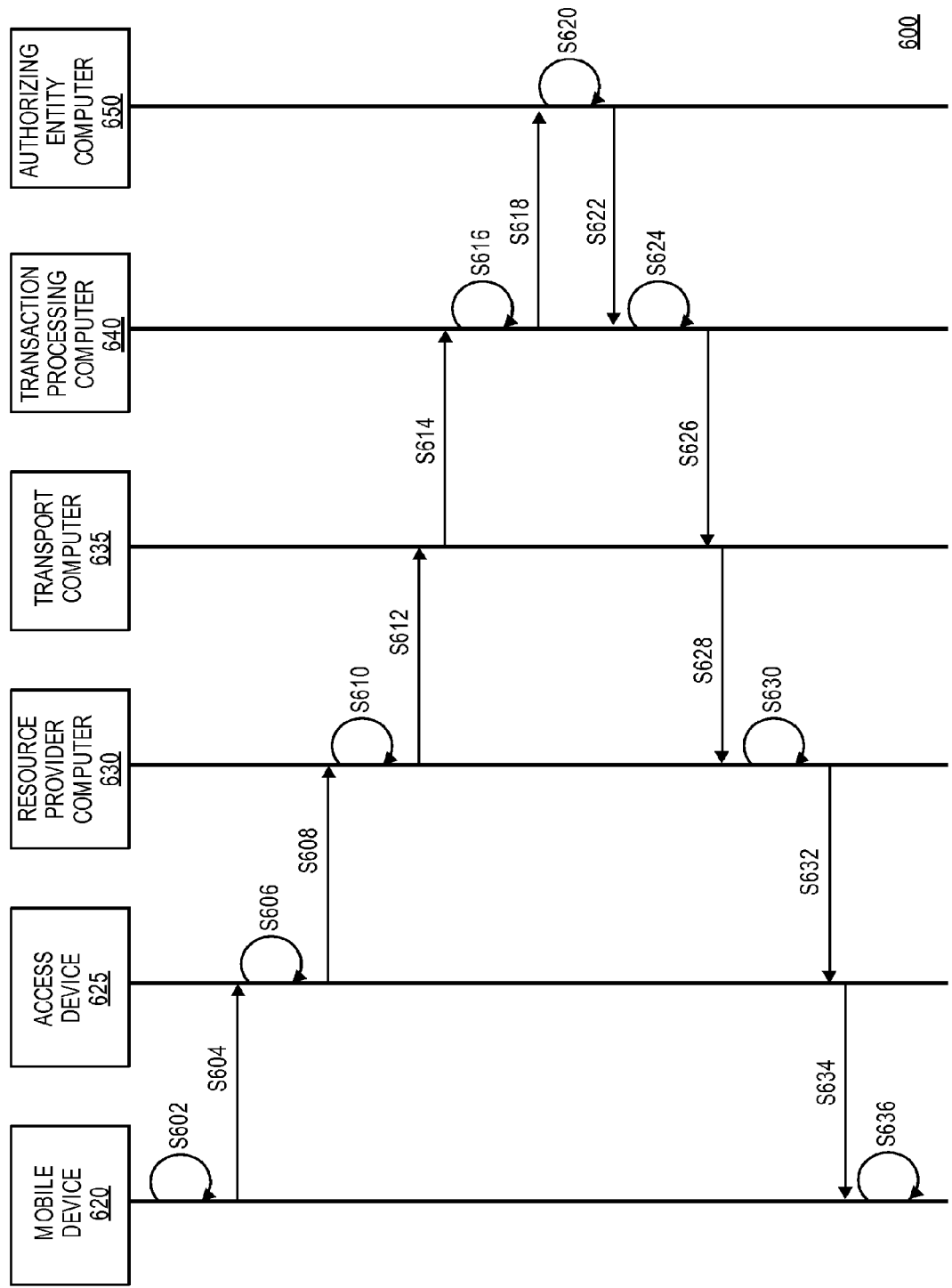
FIG. 6 shows a flow diagram illustrating a method for processing a payment, according to embodiments of the invention.

A method 600 for processing a transaction, according to embodiments of the invention, can be described with respect to FIG. 6. Some elements in other Figures are also referred to. The steps shown in the method 600 may be performed sequentially or in any suitable order in embodiments of the invention. In some embodiments, one or more of the steps may be optional.

A user may desire to purchase a good or service from the resource provider. In order to initiate the transaction, the user may provide payment credentials to the resource provider in one of several manners. In this description, the mobile device 620 is used to make the payment. However, as described above, other means such as a payment device (e.g., payment device 115), entering payment credentials online checkout webpage, or any other suitable method of payment can be used instead.

At step S602, a payment function and/or application (e.g., the digital wallet application 120J) of the mobile device 620 may be activated by the user. A data packet comprising the user's payment credentials, name, phone number, device identifier, social network user account identifier, and/or any other suitable information can be prepared for transmission.

At step S604, the mobile device 620 may provide the data packet to the access device 625. For example, the data packet may be transmitted via NFC or provided by any other suitable means of communication.

At step S606, the access device 625 may prepare the payment credentials for forwarding. For example, the access device 625 may encrypt the payment credentials, generate a payment token, and/or otherwise take steps to make sure the data is protected.

At step S608, the access device 625 may transmit the data packet (e.g., the payment credentials and/or other included information) to the resource provider computer 630. In some embodiments, the access device 625 can be a component of the resource provider computer 630.

At step S610, the resource provider computer 630 may generate an authorization request message including transaction information, resource provider identification information, the payment credentials, other information received from the access device (e.g., user information such as a name, phone number, device identifier, and/or social network user account identifier), and/or any other suitable information.

At step S612, the resource provider computer 630 may send the authorization request message to the transport computer 635. At step S614, the transport computer 635 may forward the authorization request message to the transaction processing computer 640.

At step S616, the transaction processing computer 640 may store information associated with the transaction (e.g., at the transaction database 140C). For example, a transaction record may include transaction details (e.g. items purchased, an amount, a timestamp, geo-location info), resource provider information, payment credentials, other user information (e.g., a name, phone number, device identifier, and/or social network user account identifier), and any other suitable information.

At step S618, the transaction processing computer 640 may send the authorization request message to the authorizing entity computer 650. At step S620, the authorizing entity computer 650 may then authorize or reject the transaction. For example, the authorizing entity computer 650 may decrypt payment credentials, determine whether there are funds available in a payment account associated with the payment credentials, determine whether the transaction is too risky, and otherwise determine whether the transaction should be authorized. At step S622, the authorizing entity computer 650 may then return an authorization response message to the transaction processing computer 640.

At step S624, the transaction processing computer 640 may generate and store a feedback token and/or a feedback token expiration date associated with the transaction (e.g., at the feedback token database 140D). The time period during which the feedback token is valid may be set based on resource provider preferences.

In some embodiments, a feedback token may be associated with the transaction only when the transaction has been successfully authorized. In some embodiments, the feedback token can be associated with the transaction at step S616. In other embodiments, feedback tokens may not be generated or used at all.

At step S626, the transaction processing computer 640 may forward the authorization response message to the transport computer 635. The feedback token and/or feedback token expiration date may also be included in the authorization response message or otherwise sent to the transport computer 635.

This manner of sending a feedback token along with or within an authorization request message can be a direct and efficient way to distribute feedback tokens. Instead of sending the feedback token in a separate message, and instead of distributing feedback tokens in stages (e.g., send a batch to a resource provider, and then resource provider distributes to users), feedback tokens can be directly provided in a message that is already being sent. Further, this allows the transaction processing computer 640 to bind a feedback token with a specific transaction record, making the feedback token easily traceable and identifiable.

At step S628, the transport computer 635 may forward the authorization response message to the resource provider computer 630. The resource provider computer 630 may analyze the authorization response message and determine that the transaction was authorized.

At step S630, the resource provider computer 630 may then allow any purchased goods and/or services to be released to the user, store a transaction record, and/or generate a transaction receipt for the user. The transaction receipt may include the feedback token and/or the feedback token expiration date.

At step S632, the resource provider computer 630 may transmit the transaction receipt to the access device 625. The resource provider computer 630 may also instruct the access device 625 that the purchased items can be released.

At step S634, the access device 625 may provide the transaction receipt to the user (e.g., via the mobile device 620). For example, the access device 625 may transmit an electronic receipt via NFC, print a paper receipt, display the transaction details on a screen, or otherwise provide the transaction receipt, feedback token, and/or feedback token expiration date to the user.

At step S636, the mobile device 620 may store information about the transaction including the feedback token and/or feedback token expiration date. For example, the mobile device 620 may store an electronic receipt in a digital wallet application.

After completing the transaction, the user may wish to submit feedback associated with the purchased products and/or the resource provider at a social network. The user may have a registered account with the social network, and a social network provider computer may store user information such as a user profile, a social network user account identifier, a name, contact information (e.g., an address, an email address, and/or phone number), or any other suitable information.

Before allowing the user to submit feedback for a certain resource provider or product, the social network provider computer may first confirm that the user has actually conducted a transaction with the resource provider and/or purchased the specific product or service. Several methods for confirming the transaction took place are described below. In each method, the social network provider computer may contact the transaction processing computer in order to confirm the transaction. The social network provider computer may provide information, such as a device identifier, a user account identifier, a feedback token, or any other suitable information that the transaction processing computer can use to confirm the transaction. In some embodiments, the transaction can be confirmed based on only one of those pieces of information (e.g., device identifier, user account identifier, or feedback token), or the transaction can be confirmed without any of those pieces of information (e.g., fuzzy logic can be used to confirm the transaction).

In each of the below methods, a social network provider computer communicates with a transaction processing computer to confirm that a transaction took place. However, the social network provider computer and transaction processing computer may be replaced by any other suitable entities.

For example, in some embodiments, the transaction can be confirmed by entities other than the transaction processing computer, such as the resource provider, the transport computer, the authorizing entity computer, or any other suitable entity. Accordingly, the social network provider computer may instead be referred to as a first computer and the transaction processing computer may instead be referred to as a second computer, and the first computer and second computer may be embodied by any suitable entity.

II. Authorizing Feedback Based on a User Identifier

Figure 7:
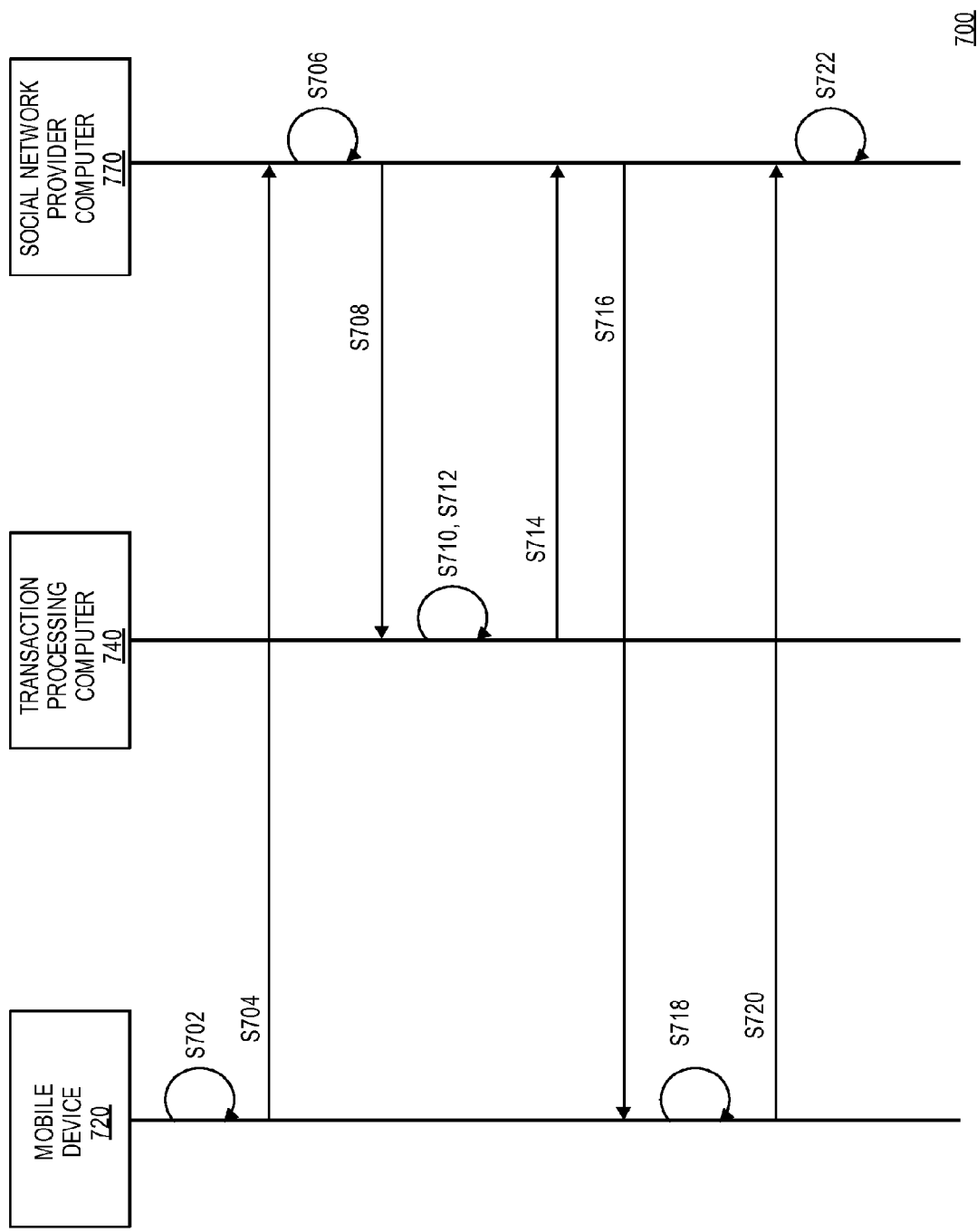
FIG. 7 shows a flow diagram illustrating a method for confirming a transaction based on a social network user account identifier, according to embodiments of the invention.

A method 700 for submitting feedback, according to embodiments of the invention, can be described with respect to FIG. 7. Some elements in other Figures are also referred to. The steps shown in the method 700 may be performed sequentially or in any suitable order in embodiments of the invention. In some embodiments, one or more of the steps may be optional.

As will be described below, in the method 700, the social network provider computer 770 provides the transaction processing computer 740 with a social network user account identifier associated with the user. The transaction processing computer 740 may store a record indicating that the social network user account identifier is associated with a set of payment credentials. Accordingly, the transaction processing computer 740 can identify the associated payment credentials, and then identify a historical transaction record that indicates the payment credentials were used to conduct a purchase at the specified resource provider.

Accordingly, in some embodiments, before the method 700 begins, there may be a process for binding the social network user account identifier with the payment credentials at the transaction processing computer 740. For example, the user may register the social network user account identifier at the transaction processing computer 740, which may bind it with the user's payment credentials, digital wallet, or any other suitable information. Thus, when the transaction processing computer 740 stores a record of a transaction that includes the payment credentials and/or digital wallet ID, the transaction record may also be associated with the user's social network user account identifier.

At step S702, the user may indicate a desire to submit feedback associated with the resource provider after the user has conducted a transaction with the resource provider. For example, the user may activate a social network application on the mobile device 720, login to the user's account, locate an information section associated with the resource provider, and select an option for submitting feedback. The user may alternatively access a social network website via the mobile device 720 or another device.

In some embodiments, the user may use the social network application to virtually check-in at a resource provider location to indicate that the user is at, near, or recently visited the resource provider location. Such a check-in may be indicative of the user's willingness to provide information about the resource provider or otherwise engage with the social network. Accordingly, the social network provider may interpret the check-in as a request to provide feedback associated with the resource provider. The social network provider may then automatically confirm that the user conducted a transaction with the resource provider and then prompt the user to submit feedback.

At step S704, the social network application may use the mobile device 720 to transmit a request for permission to submit feedback to the social network provider computer 770. The request may include information that can be used to determine whether the user conducted a transaction with the resource provider. For example, the request may include a social network user account identifier (e.g., associated with the account that is requesting permission to submit feedback), information identifying the resource provider for which the user wants to submit feedback, resource provider location details, and any other suitable information. The request may also include information about an item for which the user would like to submit feedback.

At step S706, the social network provider computer 770 may receive the request for permission to submit feedback, and may generate a transaction confirmation request message in order to determine whether the user recently conducted a transaction at the resource provider. The transaction confirmation request message may include information that can be used to determine whether the user conducted a transaction with the resource provider. For example, the request may include the social network user account identifier, the resource provider identification information, the resource provider location details, item identifying information, and any other suitable information. In some embodiments, the user may provide additional information that can help identify a previous transaction, such as a timestamp, an amount, etc.

At step S708, the social network provider computer 770 may send the transaction confirmation request message to the transaction processing computer 740. In some embodiments, the social network provider computer 770 may retrieve user transaction information from the transaction processing computer 740 ahead of time, such that the social network provider computer 770 can allow the user to submit feedback immediately upon request.

At step S710, the transaction processing computer 740 may receive the transaction confirmation request message, identify the social network user account identifier included in the transaction confirmation request message, and determine a set of payment credentials associated with the social network user account identifier (e.g., at the credential link database 140E).

At step S712, the transaction processing computer 740 may identify a transaction record (e.g., in the transaction database 140C) based on the payment credentials associated with the social network user account identifier. For example, the transaction processing computer 740 may identify a previous transaction that involved the payment credentials, the resource provider, and/or other information in the transaction confirmation request message (e.g., location information, timestamp, amount, list of purchased items, etc.). The transaction processing computer 740 may thereby determine that the user has conducted a transaction with the resource provider. In some embodiments, the transaction may only be considered a match if it occurred recently (e.g., within 1 day, 1 week, or 3 months).

At step S714, the transaction processing computer 740 may send a transaction confirmation response message to the social network provider computer 770. The transaction confirmation response message may indicate that the user conducted a transaction at the resource provider, and it may include information from the identified transaction record, such as the social network user account identifier, resource provider information, and/or transaction information.

At step S716, the social network provider computer 770 may allow the user to submit feedback associated with the resource provider and/or the items purchased during the transaction. For example, the social network provider computer 770 may send a permission granted message to the mobile device 720 and/or cause a feedback function to be activated at the social network application on the mobile device 720. In some embodiments, the user may only be allowed to provide feedback for the specific goods and/or services that the user actually purchased.

At step S718, the user may provide feedback to the social network application on the mobile device 720. For example, the user may provide a rating, review, and/or commentary related to the resource provider and/or the items purchased. In some embodiments, the social network application may prompt the user to enter feedback. For example, the user may be prompted after checking-in, or if the user has shopped at the resource provider on several occasions (e.g. 3-5) but has not provided any feedback. In some embodiments, the user may only be allowed to provide feedback within a certain time period after receiving permission (e.g., 10 minutes, 1 hour, 1 day, or 3 months).

At step S720, the social network application may then use the mobile device 720 to send the feedback to the social network provider computer 770. The social network application may also transmit information about the resource provider with which the feedback is associated, as well as information about the user (e.g., the user's alias or social network user account identifier).

At step S722, the social network provider computer 770 may use the feedback to update a resource provider record (e.g., at the resource provider database 170C). For example, the social network provider computer 770 may aggregate all feedback associated with the resource provider, and may determine an average or overall resource provider rating. The social network provider computer 770 may publicly display each specific instance of feedback (e.g., written reviews) along with overall ratings. For example, the social network provider computer 770 may provide the feedback for displaying to a user computer that wishes to view feedback associated with the resource provider.

Thus, the user may be permitted to provide feedback at the social network if the user has recently conducted a purchase at the resource provider. The transaction can be confirmed based on the user's social network user account identifier, such that the user can provide feedback without having to disclose sensitive or personal information. The transaction confirmation process may be seamless from the user's perspective, as the user may be unaware that any confirmation took place in the background.

In some embodiments, the user may be allowed to provide feedback even if the user did not verifiably conduct a transaction. In some embodiments, the social network provider computer 770 may promote feedback from users who have actually purchased goods and/or services from the resource provider. For example, the social network provider computer 770 may flag a review as verified, or may place the review at the top of a list of reviews.

III. Authorizing Feedback Based on a Device Identifier

Figure 8:
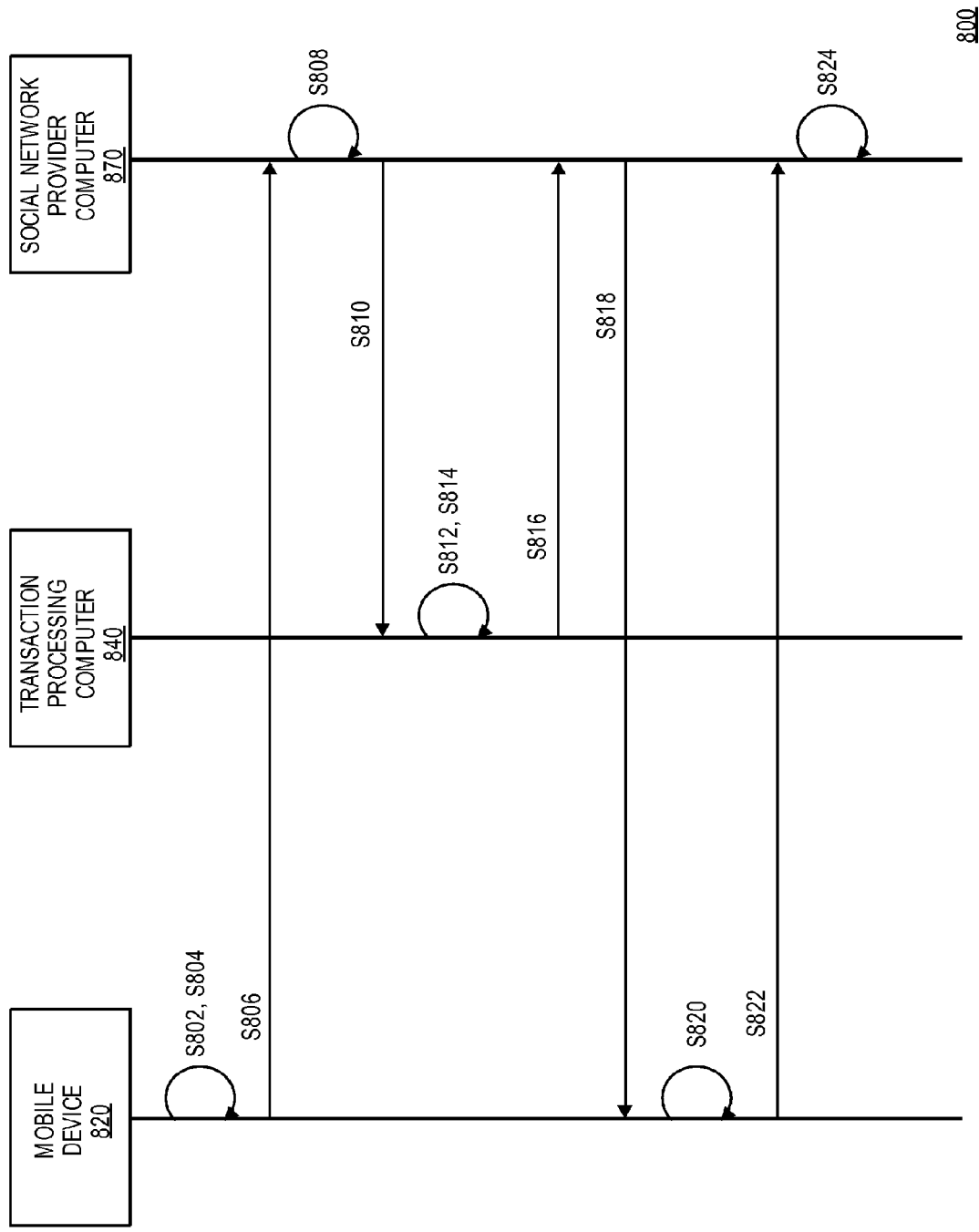
FIG. 8 shows a flow diagram illustrating a method confirming a transaction based on a user device identifier, according to embodiments of the invention.

Another method 800 for submitting feedback, according to embodiments of the invention, can be described with respect to FIG. 8. Some elements in other Figures are also referred to. The steps shown in the method 800 may be performed sequentially or in any suitable order in embodiments of the invention. In some embodiments, one or more of the steps may be optional.

As will be described below, in the method 800, the social network provider computer 870 provides the transaction processing computer 840 with a device identifier associated with the user. Transaction records stored at the transaction processing computer 840 may include device identifiers, such that a historical transaction may be identified based on a device identifier.

Accordingly, in some embodiments, during the original transaction process (e.g., the method 600), a device identifier may have been supplied along with payment credentials to the resource provider. For example, the mobile device 820 may have been used to provide payment credentials, and the device identifier may have been provided along with the payment credentials. The device identifier may have been automatically transmitted, or manually entered by the user (e.g., into an access device or web form). The device identifier may be have been passed along in the authorization messages, and the transaction processing computer 840 may have stored the device identifier in the transaction record. In some embodiments, another piece of information may instead be used, such as a digital wallet ID or a social network user account identifier.

At step S802, the user may indicate a desire to submit feedback associated with the resource provider. For example, the user may activate a social network application on the mobile device 820, login to the user's account, locate an information section associated with the resource provider, and select an option for submitting feedback.

In some embodiments, the user may use the social network application to virtually check-in at a resource provider location to indicate that the user is at, near, or recently visited the resource provider location. Such a check-in may be indicative of the user's willingness to provide information about the resource provider or otherwise engage with the social network. Accordingly, the social network provider may interpret the check-in as a request to provide feedback associated with the resource provider. The social network provider may then automatically confirm that the user conducted a transaction with the resource provider and then prompt the user to submit feedback.

At step S804, the social network application may identify a device identifier associated with the mobile device 820 currently being used. For example, the social network application may identify an MSISDN, SMS text address, phone number, or an IP address associated with the mobile device 820.

At step S806, the social network application may use the mobile device 820 to transmit a request for permission to submit feedback to the social network provider computer 870. The request may include information that can be used to determine whether the user conducted a transaction with the resource provider. For example, the request may include the device identifier, information identifying the resource provider for which the user wants to submit feedback, resource provider location details, and any other suitable information. The request may also include information about an item for which the user would like to submit feedback.

At step S808, the social network provider computer 870 may receive the request for permission to submit feedback, and may generate a transaction confirmation request message in order to determine whether the user recently conducted a transaction at the resource provider. The transaction confirmation request message may include information that can be used to determine whether the user conducted a transaction with the resource provider. For example, the request may include the device identifier, the resource provider identification information, the resource provider location details, item identifying information, and any other suitable information. In some embodiments, the user may provide additional information that can help identify a previous transaction, such as a timestamp, an amount, etc.

At step S810, the social network provider computer 870 may send the transaction confirmation request message to the transaction processing computer 840. In some embodiments, the social network provider computer 870 may retrieve user transaction information from the transaction processing computer 840 ahead of time, such that the social network provider computer 870 can allow the user to submit feedback immediately upon request.

At step S812, the transaction processing computer 840 may receive the transaction confirmation request message and identify the device identifier included in the transaction confirmation request message. For example, the device identifier may be flagged as a piece of information that can be used to identify a transaction.

At step S814, the transaction processing computer 840 may identify a transaction record (e.g., in the transaction database 140C) based on the device identifier. For example, the transaction processing computer 840 may identify a previous transaction that involved the device identifier, the resource provider, and/or other information in the transaction confirmation request message (e.g., location information, timestamp, amount, list of purchased items, etc.). The transaction processing computer 840 may thereby determine that the same mobile device 820 currently being used to submit feedback at the resource provider was also used to conduct a purchase at the resource provider. It may be safe to assume that the user who is currently operating the mobile device 820 is the same user that operated the mobile device 820 to conduct the purchase. Accordingly, the transaction processing computer 840 may determine that the user has conducted a transaction with the resource provider. In some embodiments, the transaction may only be considered a match if it occurred recently (e.g., within 1 day, 1 week, or 3 months).

At step S816, the transaction processing computer 840 may send a transaction confirmation response message to the social network provider computer 870. The transaction confirmation response message may indicate that the mobile device 820 currently being used to submit feedback for the resource provider was also used to conduct a purchase at the resource provider. Alternatively, the transaction processing computer 840 may simply indicate that the user conducted a transaction at the resource provider. The transaction confirmation response message may include information from the identified transaction record, such as the device identifier, resource provider information, and/or transaction information.

At step S818, the social network provider computer 870 may send a permission granted message to the mobile device 820 indicating that the user is authorized to submit feedback associated with the resource provider and/or the items purchased during the transaction. For example, the social network provider computer 870 may cause a feedback function to be activated at the social network application on the mobile device 820. In some embodiments, the user may only be allowed to provide feedback for the specific goods and/or services that the user actually purchased.

At step S820, the user may provide feedback via the social network application on the mobile device 820. For example, the user may provide a rating, review, and/or commentary related to the resource provider and/or the items purchased. In some embodiments, the social network application may prompt the user to enter feedback. For example, the user may be prompted after checking-in, or if the user has shopped at the resource provider on several occasions (e.g. 3-5) but has not provided any feedback. In some embodiments, the user may only be allowed to provide feedback within a certain time period after receiving permission (e.g., 10 minutes, 1 hour, 1 day, or 3 months).

At step S822, the social network application may then use the mobile device 820 to send the feedback to the social network provider computer 870. The social network application may also transmit information about the resource provider with which the feedback is associated, as well as information about the user (e.g., the user's alias or social network user account identifier).

At step S824, the social network provider computer 870 may use the feedback to update a resource provider record (e.g., at the resource provider database 170C). For example, the social network provider computer 870 may aggregate all feedback associated with the resource provider, and may determine an average or overall resource provider rating. The social network provider computer 870 may publicly display each specific instance of feedback (e.g., written reviews) as well as overall ratings.

Thus, the user may be permitted to provide feedback at the social network if the user has recently conducted a purchase at the resource provider. The transaction can be confirmed based on the user's device identifier, such that the user can provide feedback without having to disclose sensitive or personal information. The transaction confirmation process may be seamless from the user's perspective, as the user may be unaware that any confirmation took place in the background. The feedback can also be highly trusted, as it is likely that if feedback is submitted from the same mobile device that made the purchase, the feedback is being submitted by the same user that made the purchase.

IV. Authorizing Feedback Based on a Feedback Token

Figure 9:
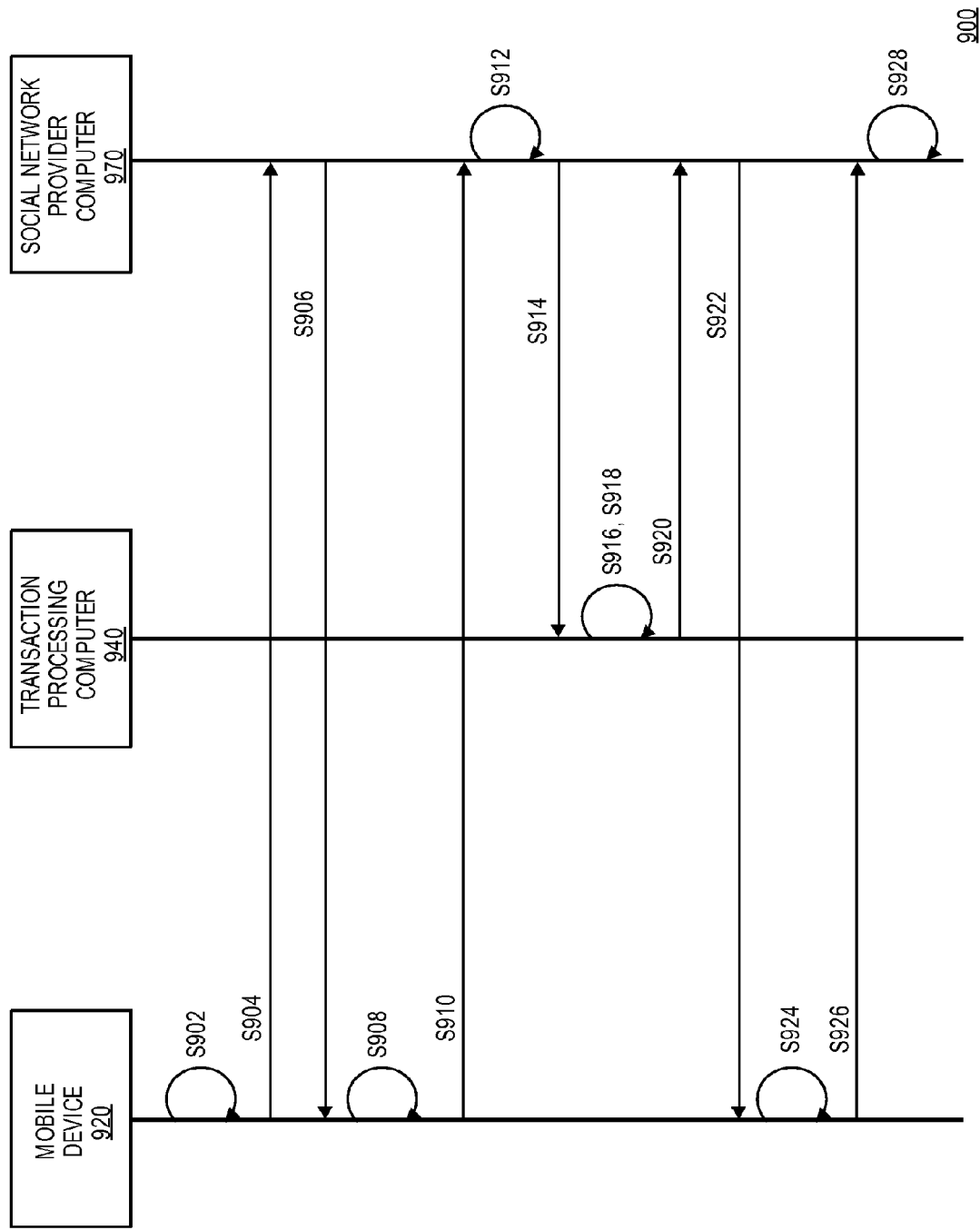
FIG. 9 shows a flow diagram illustrating a method for confirming a transaction based on a feedback token, according to embodiments of the invention.
Figure 10:
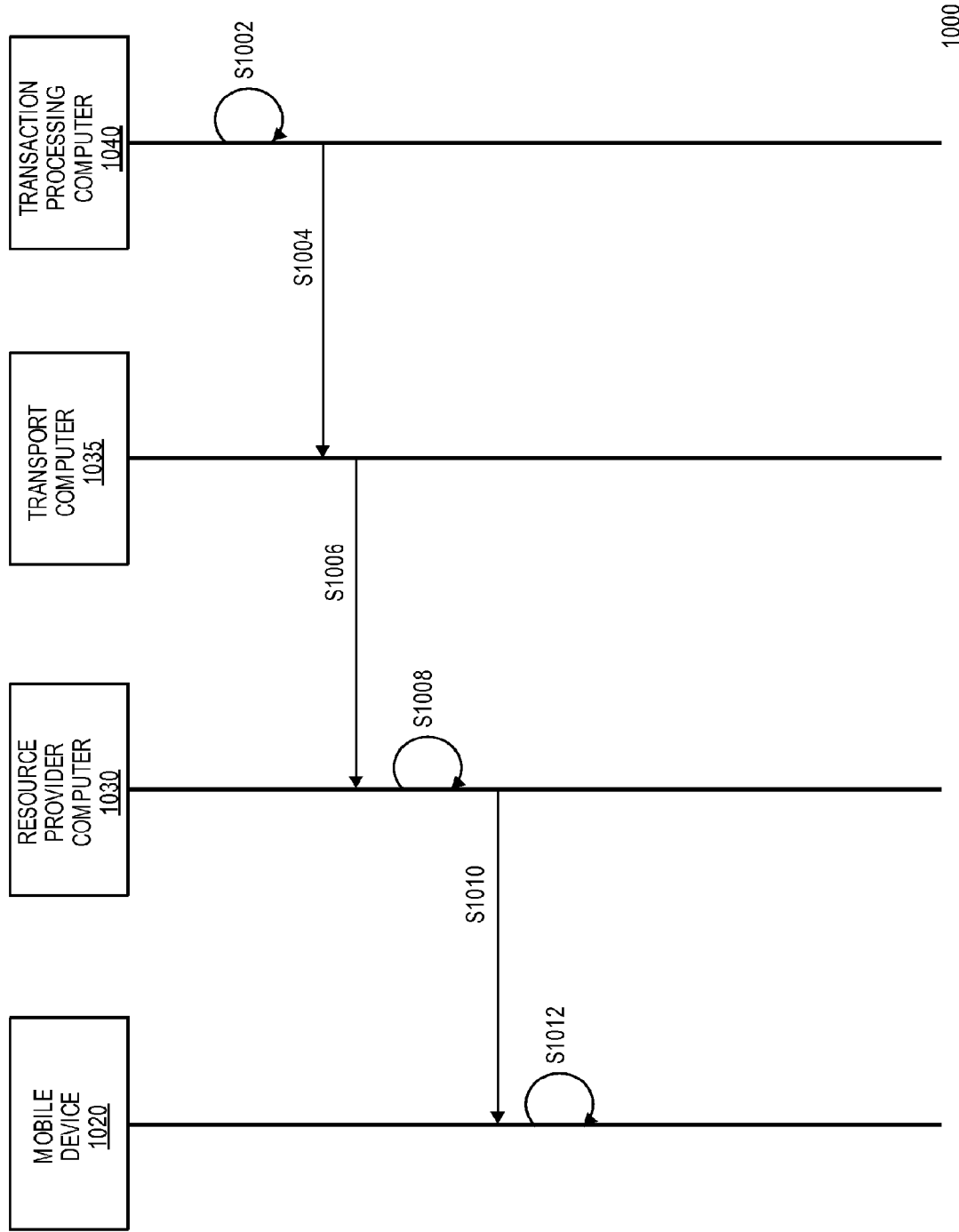
FIG. 10 shows a flow diagram illustrating a method for providing a promotional offer, according to embodiments of the invention.

Another method 900 for submitting feedback, according to embodiments of the invention, can be described with respect to FIG. 9. Some elements in other Figures are also referred to. The steps shown in the method 900 may be performed sequentially or in any suitable order in embodiments of the invention. In some embodiments, one or more of the steps may be optional.

As will be described below, in the method 900, the social network provider computer 970 provides the transaction processing computer 940 with a feedback token received from the user. Transaction records stored at the transaction processing computer 940 may include the feedback token, such that a historical transaction may be identified based on the feedback token.

Accordingly, in some embodiments, during the original transaction process (e.g., the method 600), the feedback token may have been associated with a transaction record. For example, the transaction processing computer 940 may have generated and/or assigned the feedback token to the transaction during the authorization process. The transaction processing computer 940 may have provided the feedback token to the resource provider computer via the authorization response message, and the resource provider computer may have provided the feedback token to the user (e.g., via a receipt).

At step S902, the user may indicate a desire to submit feedback associated with the resource provider. For example, the user may activate a social network application on the mobile device 920, login to the user's account, locate an information section associated with the resource provider, and select an option for submitting feedback. The user may alternatively access a social network website via the mobile device 920 or another device.

In some embodiments, the user may use the social network application to virtually check-in at a resource provider location to indicate that the user is at, near, or recently visited the resource provider location. Such a check-in may be indicative of the user's willingness to provide information about the resource provider or otherwise engage with the social network. Accordingly, the social network provider may interpret the check-in as a request to provide feedback associated with the resource provider. The social network provider may then automatically confirm that the user conducted a transaction with the resource provider and then prompt the user to submit feedback.

At step S904, the social network application may use the mobile device 920 to transmit a request for permission to submit feedback to the social network provider computer 970. The request may include information that can be used to determine whether the user conducted a transaction with the resource provider. For example, the request may include information identifying the resource provider for which the user wants to submit feedback, resource provider location details, and any other suitable information. The request may also include information about an item for which the user would like to submit feedback.

The social network provider computer 970 may then receive the request for permission to submit feedback and determine that the user needs to provide a feedback token before permission can be granted. At step S906, the social network provider computer 970 may send prompt for a feedback token back to the mobile device 920. In some embodiments, the social network application on the mobile device 920 may automatically prompt the user for a feedback token before sending the permission request at step S904.

At step S908, the user may provide a feedback token to the social network application or website. For example, the user may manually enter a feedback token that was received via a receipt. In some embodiments, the mobile device 920 or social network application may store the feedback token, as well as automatically provide the feedback token when prompted. Thus, in some embodiments, receiving, storing, and providing the feedback token can happen seamlessly and automatically from the user's perspective.

At step S910, the social network application may use the mobile device 920 to transmit the feedback token to the social network provider computer 970. The feedback token may be accompanied by any other suitable information, such as the information sent at step S904.

At step S912, the social network provider computer 970 may receive the feedback token and may generate a transaction confirmation request message in order to determine whether the user recently conducted a transaction at the resource provider. The transaction confirmation request message may include information that can be used to determine whether the user conducted a transaction with the resource provider. For example, the request may include the feedback token, the resource provider identification information, the resource provider location details, item identifying information, and any other suitable information. In some embodiments, the user may provide additional information that can help identify a previous transaction, such as a timestamp, an amount, etc. In some embodiments, the social network provider computer 970 may be able to immediately determine that the feedback token is authentic and then grant feedback permission.

At step S914, the social network provider computer 970 may send the transaction confirmation request message to the transaction processing computer 940. In some embodiments, the social network provider computer 970 may retrieve user transaction information from the transaction processing computer 940 ahead of time, such that the social network provider computer 970 can allow the user to submit feedback immediately upon request.

At step S916, the transaction processing computer 940 may receive the transaction confirmation request message and identify the feedback token included in the transaction confirmation request message. For example, the feedback token may be flagged as a piece of information that can be used to locate a transaction.

At step S918, the transaction processing computer 940 may identify a transaction record (e.g., in the transaction database 140C) based on the feedback token. For example, the transaction processing computer 940 may identify a previous transaction that involved the feedback token, the resource provider, and/or other information in the transaction confirmation request message (e.g., location information, timestamp, amount, list of purchased items, etc.). The transaction processing computer 940 may thereby determine that the user has conducted a transaction with the resource provider. In some embodiments, the transaction may only be considered a match if it occurred recently (e.g., within 1 day, 1 week, or 3 months). For example, the feedback token may expire after a certain time period, which may be indicated by a feedback token expiration date (which may be passed along with the feedback token).

In some embodiments, the transaction processing computer 940 may be able to simply authenticate that the feedback token is authentic (e.g., based on a record in the feedback token database 140D). For example, the feedback token may be unique, and the transaction processing computer 940 may simply determine that the feedback token has not yet been redeemed. The transaction processing computer 940 may also determine that the resource provider and other transaction information are associated with the feedback token (e.g., in the feedback token database 140D).

At step S920, the transaction processing computer 940 may send a transaction confirmation response message to the social network provider computer 970. The transaction confirmation response message may indicate that the user conducted a transaction at the resource provider, and it may include information from the identified transaction record, such as the feedback token, resource provider information, and/or transaction information.

At step S922, the social network provider computer 970 may send a permission granted message to the mobile device 920 indicating that the user is authorized to submit feedback associated with the resource provider and/or the items purchased during the transaction. For example, the social network provider computer 970 may cause a feedback function to be activated at the social network application on the mobile device 920. In some embodiments, the user may only be allowed to provide feedback for the specific goods and/or services that the user actually purchased.

At step S924, the user may provide feedback via the social network application on the mobile device 920. For example, the user may provide a rating, review, and/or commentary related to the resource provider and/or the items purchased. In some embodiments, the social network application may prompt the user to enter feedback. For example, the user may be prompted after checking-in, or if the user has shopped at the resource provider on several occasions (e.g. 3-5) but has not provided any feedback. In some embodiments, the user may only be allowed to provide feedback within a certain time period after receiving permission (e.g., 10 minutes, 1 hour, 1 day, or 3 months).

At step S926, the social network application may then use the mobile device 920 to send the feedback to the social network provider computer 970. The social network application may also transmit information about the resource provider with which the feedback is associated, as well as information about the user (e.g., the user's alias or social network user account identifier).

At step S928, the social network provider computer 970 may use the feedback to update a resource provider record (e.g., at the resource provider database 170C). For example, the social network provider computer 970 may aggregate all feedback associated with the resource provider, and may determine an average or overall resource provider rating. The social network provider computer 970 may publicly display each specific instance of feedback (e.g., written reviews) and overall ratings.

Thus, the user may be permitted to provide feedback at the social network if the user has recently conducted a purchase at the resource provider. The transaction can be confirmed based on the user's feedback token, such that the user can provide feedback without having to disclose sensitive or personal information. The transaction confirmation process may be seamless from the user's perspective, as the user may be unaware that any confirmation took place in the background, and the feedback token may also be stored and provided automatically.

V. Providing a Promotional Offer

In some embodiments, one or more entities, such as the social network provider and/or the resource provider, may provide incentives such as promotional offers to users that submit feedback. A method 1000 for providing promotional offers, according to embodiments of the invention, can be described with respect to FIG. 10. Some elements in other Figures are also referred to. The steps shown in the method 1000 may be performed sequentially or in any suitable order in embodiments of the invention. In some embodiments, one or more of the steps may be optional.

In some embodiments, promotional offers can be triggered by the transaction confirmation requests described in methods 700, 800, and/or 900. For example, at step S1002, the transaction processing computer 1040 may receive a transaction confirmation request message from the social network provider computer, and the transaction procession computer 1040 may determine that a certain user has conducted a transaction with a certain resource provider. These steps can be determined as described above in methods 700, 800, and/or 900.

At step S1004, the transaction processing computer 1040 may then send a transaction confirmation response message, or any other suitable notification that the user conducted a transaction and is now engaging in a feedback process, to a transport computer 1035 associated with the resource provider computer 1030. This message may be sent in addition to or instead of sending the transaction confirmation response message to the social network provider computer, as described above. The transaction processing computer 1040 may also indicate that the user has checked-in at the resource provider via a social network provider computer, and/or that the user is requesting permission to submit feedback associate with the resource provider.

At step S1006, the transport computer 1035 may forward the transaction confirmation response message to the resource provider computer 1030. For example, the resource provider computer 1030 may be identified in the message and indicated as the intended recipient.

At step S1008, the resource provider computer 1030 may receive the transaction confirmation response message (which may include transaction information, user information, resource provider information, etc.), and may identify a user indicated in the transaction confirmation response message. In some embodiments, the resource provider computer 1030 may store its own transaction records, and it may confirm that the transaction confirmation response message is legitimate based on the records. The resource provider computer 1030 may then determine that a promotional offer can be provided to the user. For example, the resource provider may wish to provide promotional offers to users that submit feedback associated with the resource provider, and the transaction confirmation response message can serve as an indication that the user is submitting feedback.

At step S1010, the resource provider computer 1030 may transmit a promotional offer to the user (e.g., to the mobile device 1020 of the user). In some embodiments, the resource provider computer 1030 may have the user's contact information, and may be able to send the promotional offer directly (e.g., via email, SMS, etc.). In other embodiments, the resource provider computer 1030 may credit the promotional offer to the user's account at the resource provider. In other embodiments, the resource provider computer 1030 may request the transaction processing computer 1040 or the social network provider computer to provide the promotional offer to the user on behalf of the resource provider computer 1030.

At step S1012, the user may receive the promotional offer (e.g., via the mobile device 1020). The promotional offer may then be stored at the mobile device 1020 for later use (e.g., in a digital wallet application).

In some embodiments, the transaction processing computer 1040, the social network provider computer, the resource provider computer 1030, and/or any suitable third party may aggregate data about multiple purchases by one or more users. The data may be analyzed to determine user spending trends and preferences, and promotional offers provided to the user may be refined and/or personalized accordingly.

In some embodiments, the social network provider computer may provide promotional offers to a user that consistently submits feedback (e.g. generally or for specific types of goods or services). In some embodiments, the transaction processing computer 1040, the social network provider computer, the resource provider computer 1030, and/or any suitable third party may provide offers to the user based on the user's location (e.g. the location indicated by the mobile device 1020). In some embodiments, promotional offers may be provided based on the reputation of the resource provider (e.g., promotional offers may be provided more frequently for a resource provider with a bad reputation).

Embodiments of the invention have a number of advantages. For example, in embodiments of the invention, feedback may only be submitted by users who have verifiably interacted with the subject of their feedback, and can therefore provide an authentic evaluation. Thus, illegitimate feedback is prevented. As a result, published feedback can be dependable when considering whether to interact with a certain service provider or purchase a certain good or service.

Embodiments of the invention also advantageously allow users to anonymously or semi-anonymously submit feedback. Instead of using invasive methods to verify a user's identity and historical activity, reliable yet anonymous information can be used to confirm that a user interacted with a resource provider. For example, a previous interaction can be confirmed with a feedback token, a social network user account identifier, a user device identifier, or any other suitable piece of information that is not considered sensitive and that does not disclose the identity of the user to the public or the social network provider, but that is indicative of the user and/or interaction.

Embodiments of the invention are further advantageous as the feedback process may appear seamless and easy to the user. For example, when a transaction is confirmed based on a social network user identifier or a device identifier, the entire confirmation process can happen in the background without the user's knowledge. Alternatively, when the feedback token is used, the user can simply enter the feedback token. In either embodiment, little or no user action may be needed for confirming the transaction, such that the user can easily proceed to submitting feedback.

Embodiments of the invention also advantageously allow social network providers other suitable entities to have access to user spending habits. For example, the social network provider may receive information about transactions completed by the user, and may thereby have information about user spending patterns. Accordingly, social network providers may be able to provide targeted promotional offers and otherwise use the spending pattern data. In addition, resource providers may be informed when a user is submitting feedback for the resource provider, and may thus be able to reward users for submitting feedback, as described above.

Figure 11:
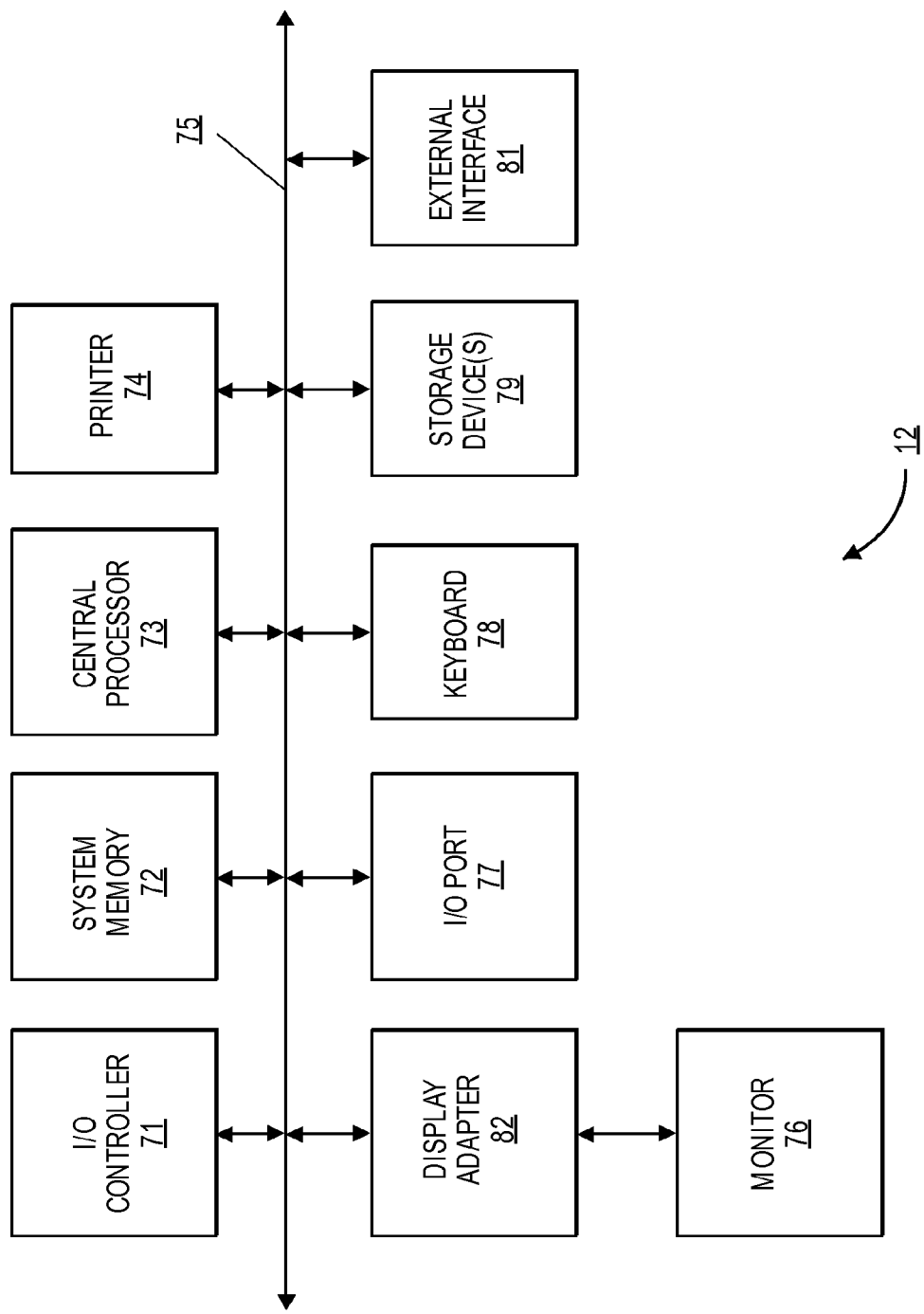
FIG. 11 shows a block diagram of a computer apparatus according to an embodiment of the invention.

FIG. 11 is a high-level block diagram 12 of a computer system that may be used to implement any of the entities or components described above. The subsystems shown in FIG. 11 are interconnected via a system bus 75. Additional subsystems include a printer 74, keyboard 78, storage device 79, and monitor 76, which is coupled to display adapter 82. Peripherals and input/output (I/O) devices, which couple to I/O controller 71, can be connected to the computer system by any number of means known in the art, such as a serial port. For example, I/O port 77 or external interface 81 can be used to connect the computer apparatus to a wide area network such as the Internet, a mouse input device, or a scanner. The interconnection via system bus 75 allows the central processor 73 to communicate with each subsystem and to control the execution of instructions from system memory 72 or the storage device 79, as well as the exchange of information between subsystems. The system memory 72 and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
sending, by a mobile device, to a first computer, a request from a user for permission to submit feedback associated with a resource provider, wherein the request is sent after and authorization request message associated with an interaction between the user and the resource provider was sent to a second computer different from the first computer;
receiving, at the mobile device, from the first computer, permission to submit feedback associated with the resource provider after the first computer sends a transaction confirmation request message to the second computer and subsequently after the first computer receives a confirmation from the second computer that the user has interacted with the resource provider;
receiving, at the mobile device, from the user, feedback associated with the resource provider; and
sending, by the mobile device, the feedback to the first computer.

2. The method of claim 1,
wherein the transaction confirmation request message is sent to inquire whether the user has interacted with the resource provider, and wherein the transaction confirmation request message is sent before the first computer activates a feedback function, and
wherein the transaction confirmation response message indicating that the user has interacted with the resource provider is based on an interaction record of the second computer.

3. The method of claim 2,
wherein the transaction confirmation request message includes a social network user account identifier associated with the user, and
wherein the interaction is identified based on a credential associated with the social network user account identifier at the second computer.

4. The method of claim 2,
wherein the mobile device is associated with a device identifier,
wherein the transaction confirmation request message includes the device identifier, and
wherein the interaction is identified based on the device identifier.

5. The method of claim 4, wherein the mobile device was used to interact with the resource provider, and further comprising:
providing, by the mobile device, the device identifier to the resource provider during the interaction,
wherein the authorization request message includes the device identifier, and
wherein the second computer stores the device identifier in the interaction record.

6. The method of claim 2, further comprising:
transmitting, by the mobile device, a feedback token to the first computer,
wherein the transaction confirmation request message includes the feedback token, and wherein the interaction is identified based on the feedback token.

7. The method of claim 1, further comprising:
activating, at the mobile device, a feedback function at a social network application.

8. The method of claim 1, wherein the first computer is a social network provider computer, and wherein the second computer is a transaction processing computer.

9. The method of claim 1, wherein the user requests permission to submit feedback associated with a resource provider by indicating that the user is located at the resource provider.

10. The method of claim 1, wherein before the request from a user for permission to submit feedback associated with a resource provider is sent, the first computer confirms with the second computer that the user has interacted with the resource provider.

11. A mobile device comprising:
a hardware processor; and
a non-transitory computer readable medium comprising code, executable by the processor, for implementing a method comprising:
sending, to a first computer, a request from a user for permission to submit feedback associated with a resource provider, wherein the request is sent after an authorization request message associated with an interaction between the user and the resource provider was sent to a second computer different from the first computer after an authorization request message associated with the interaction was sent to a second computer different from the first computer;
receiving, from the first computer, permission to submit feedback associated with the resource provider after the first computer sends a transaction confirmation request message to the second computer and subsequently after the first computer receives a confirmation from the second computer that the user has interacted with the resource provider;
receiving, from the user, feedback associated with the resource provider; and
sending the feedback to the first computer.

12. The mobile device of claim 11,
wherein the transaction confirmation request message is sent to inquire whether the user has interacted with the resource provider, and wherein the transaction confirmation request message is sent before the first computer activates a feedback function, and
wherein the transaction confirmation response message indicating that the user has interacted with the resource provider is based on an interaction record of the second computer.

13. The mobile device of claim 12,
wherein the transaction confirmation request message includes a social network user account identifier associated with the user, and
wherein the interaction is identified based on a credential associated with the social network user account identifier at the second computer.

14. The mobile device of claim 12,
wherein the mobile device is associated with a device identifier,
wherein the transaction confirmation request message includes the device identifier, and
wherein the interaction is identified based on the device identifier.

15. The mobile device of claim 14, wherein the mobile device was used to interact with the resource provider, and further comprising:
providing the device identifier to the resource provider during the interaction,
wherein the authorization request message includes the device identifier, and
wherein the second computer stores the device identifier in the interaction record.

16. The mobile device of claim 12, further comprising:
transmitting a feedback token to the first computer,
wherein the transaction confirmation request message includes the feedback token, and
wherein the interaction is identified based on the feedback token.

17. The mobile device of claim 11, further comprising:
activating a feedback function at a social network application.

18. The mobile device of claim 11, wherein the first computer is a social network provider computer, and wherein the second computer is a transaction processing computer.

19. The mobile device of claim 11, wherein the user requests permission to submit feedback associated with a resource provider by indicating that the user is located at the resource provider.

20. The mobile device of claim 11, wherein before sending the request from a user for permission to submit feedback associated with a resource provider, the first computer confirms with the second computer that the user has interacted with the resource provider.

* * * * *

UNITED STATES PATENT AND TRADEMARK OFFICE
CERTIFICATE OF CORRECTION

PATENT NO. : 9,852,479 B2
APPLICATION NO. : 15/600289
DATED : December 26, 2017
INVENTOR(S) : Ajit Gaddam, Selim Aissi and Gyan Prakash Page 1 of 1

It is certified that error appears in the above-identified patent and that said Letters Patent is hereby corrected as shown below:

In the Claims

Column 30, Claim 1, Line 15 remove "and" and insert -- an --

Column 31, Claim 11, Lines 30-32 remove "after an authorization request message associated with the interaction was sent to a second computer different from the first computer"

Signed and Sealed this
Sixth Day of February, 2018

Joseph Matal
*Performing the Functions and Duties of the
Under Secretary of Commerce for Intellectual Property and
Director of the United States Patent and Trademark Office*